US007927689B2

(12) United States Patent
Leenders et al.

(10) Patent No.: US 7,927,689 B2
(45) **Date of Patent: *Apr. 19, 2011**

(54) INFORMATION CARRIER PRECURSOR AND INFORMATION CARRIER PRODUCED THEREWITH

(75) Inventors: Luc Leenders, Herentals (BE); Eddie Daems, Herentals (BE); Michel Werts, Landgraaf (NL)

(73) Assignee: Agfa-Gavaert N.V., Mortsel (BE)

( * ) Notice: Subject to any disclaimer, the term of this patent is extended or adjusted under 35 U.S.C. 154(b) by 402 days.

This patent is subject to a terminal disclaimer.

(21) Appl. No.: 11/738,118

(22) Filed: Apr. 20, 2007

(65) Prior Publication Data

US 2008/0138641 A1 Jun. 12, 2008

Related U.S. Application Data

(60) Provisional application No. 60/869,602, filed on Dec. 12, 2006, provisional application No. 60/869,609, filed on Dec. 12, 2006, provisional application No. 60/908,533, filed on Mar. 28, 2007.

(30) Foreign Application Priority Data

Dec. 7, 2006 (EP) .................................... 06125552
Dec. 7, 2006 (EP) .................................... 06125555
Mar. 27, 2007 (EP) .................................... 07104954

(51) Int. Cl.
*B32B 7/02* (2006.01)

(52) U.S. Cl. ..... 428/212; 428/220; 428/545; 428/304.4; 156/306.6

(58) Field of Classification Search .................. 428/212, 428/273, 545, 304.4
See application file for complete search history.

(56) References Cited

U.S. PATENT DOCUMENTS 2,352,014 A 6/1944 Rott
2,984,030 A 5/1961 Hannon
3,279,826 A 10/1966 Rudershausen et al.
3,332,775 A 7/1967 Mandler
3,414,998 A 12/1968 Berger
3,675,948 A 7/1972 Wicker
3,827,726 A 8/1974 McVoy et al.
3,961,956 A 6/1976 Fukuda et al.
4,278,756 A 7/1981 Bouldin et al.
4,499,211 A 2/1985 Walch et al.
4,820,608 A 4/1989 Claeys et al.
6,210,777 B1 * 4/2001 Vermeulen et al. ........ 428/195.1
6,358,596 B1 3/2002 Mehta et al.
6,364,993 B1 4/2002 Netsch et al.
6,645,280 B1 11/2003 Zhu et al.
6,723,383 B2 4/2004 Nigam
2003/0213550 A1 * 11/2003 Daems et al. ................. 156/250

FOREIGN PATENT DOCUMENTS

EP 0 390 638 B1 10/1990
EP 1 362 710 B1 11/2003
EP 1 398 175 A2 3/2004
GB 840731 7/1960
GB 1 073 433 6/1967
GB 1243045 8/1971
GB 1321046 6/1973
GB 1405662 9/1975
GB 1520904 8/1978
GB 1546103 5/1979
GB 1581388 12/1980
JP 10-157280 A2 6/1998
WO WO 81/01389 A1 5/1981
WO WO 2004/52655 A1 6/2004

OTHER PUBLICATIONS

Research Disclosure nr. 15.157 (Apr. 1977), pp. 32-39.

* cited by examiner

*Primary Examiner* — Mark Ruthkosky
*Assistant Examiner* — Lawrence D Ferguson
(74) *Attorney, Agent, or Firm* — Leydig, Voit & Mayer, Ltd.

(57) ABSTRACT

Information carrier precursor comprising a rigid sheet or support; a receiving layer configuration comprising at least one layer; and at least one substance, optionally provided pattern-wise, capable of and available for interacting in situ with at least one species diffusing through the receiving layer configuration to produce a functional species, wherein at least one layer of the receiving layer configuration is opaque, porous, has the capability of being rendered substantially transparent by penetration by a lacquer provided at the outermost surface of the receiving layer configuration and comprises at least one pigment and at least one binder; a method for producing the above-mentioned information carrier precursor; a method for producing an information carrier; and information carriers produced therewith.

32 Claims, No Drawings

INFORMATION CARRIER PRECURSOR AND INFORMATION CARRIER PRODUCED THEREWITH

CROSS-REFERENCE TO RELATED PATENT APPLICATIONS

This application claims the benefit of U.S. Provisional Application No. 60/869,602 filed Dec. 12, 2006; U.S. Provisional Application No. 60/869,609 filed Dec. 12, 2006; and U.S. Provisional Application No. 60/908,533 filed Mar. 28, 2007, which are all incorporated by reference. In addition, this application claims the benefit of European Application No. 06125552 filed Dec. 7, 2006; and European Application No. 06125555 filed Dec. 7, 2006; and European Application No. 07104954 filed Mar. 27, 2007, which are all also incorporated by reference.

FIELD OF THE INVENTION

The present invention relates to an information carrier precursor, a method for producing an information carrier precursor, and a method for producing an information carrier and information carriers produced therewith.

BACKGROUND OF THE INVENTION

The security field encompasses not only personalized documents such as passports, driving licenses, identity cards (ID cards) and admission documents such as visa's and entry tickets, but also the authentification and identification of goods to avoid counterfeiting, tampering and fraud such as lottery tickets, share certificates, transaction documents, labels on luggage and the packaging of pharmaceuticals and high value products in general.

The term "identity card" encompasses cards requiring bearer identification and range from national identity cards to establish the national identity of their civilians to cards involved in the electronic transfer of money such as bank cards, pay cards, credit cards and shopping cards to security cards authorizing access to the bearer of the card to particular areas such as a company (employee ID card), the military, a public service, the safe deposit departments of banks, etc. to social security cards to membership cards of clubs and societies.

ID cards usually contain information referring both to the authority issuing the card on the one hand and to the owner of the card on the other. The first type of information may be general information such as a name and/or logo of the issuing authority, or security marks, such as a watermark and security print, e.g. a repeating monochrome pattern or a gradually changing colour pattern which are difficult to counterfeit. The second type includes e.g. the unique card number, personal data such as a birth day, a photo of the owner, and a signature. The card can further contain hidden information and therefore contain a magnetic strip or an electronic chip ("smart cards").

A large set of ID cards are usually prepared on a large web or sheet by a step and repeat process, after which the web or sheet is cut into multiple items with the appropriate dimensions each representing a personal ID card. Smart cards and ID cards have now the standardized dimensions of 85.6 mm×54.0 mm×0.76 mm.

Normally, the card is protected by a plastic sheet material for example by lamination of the card to a plastic sheet or, as is usually the case, by lamination between two plastic sheets.

In view of their widespread uses, particularly in commercial transactions such as cashing cheques, credit purchases etc., it is important that the person relying on the ID card to identify the bearer have maximum assurance that the ID card has not been altered and/or that the ID card is not a counterfeit.

The art's response to the counterfeiting problem has involved the integration of "verification features" with ID cards to evidence their authenticity. The best known of these "verification features" involve signatures such as the signature of the one authorized to issue the ID card or the signature of the bearer. Other "verification features" have included the use of watermarks, fluorescent materials, validation patterns or markings and polarizing stripes. These "verification features" are integrated into ID cards in various ways and they may be visible or invisible in the finished card. If invisible, they can be detected by viewing the feature under conditions which render it visible. Details relating to the use of "verification features" in ID cards can be found in U.S. Pat. No. 2,984,030, U.S. Pat. No. 3,279,826; U.S. Pat. No. 3,332,775, U.S. Pat. No. 3,414,998, U.S. Pat. No. 3,675,948, U.S. Pat. No. 3,827,726 and U.S. Pat. No. 3,961,956.

One method of realizing information in a multicolored form, e.g. as an image or pattern, is the use of a dye diffusion transfer imaging system in which dye(s) are made to diffuse in pattern-wise distribution. All dye diffusion transfer imaging systems are based on the same principle of modifying the solubility of the dyes as a function of the amount of photographic silver halide developed. In commonly known dye diffusion transfer imaging processes the dye-providing substances are either initially mobile in alkaline aqueous media and become immobilized during processing, or initially immobile and become mobilized during processing. A survey of such processes has been given by C. C. Van de Sande in Angew. Chem.-Int. Ed. Engl. 22 (1983) no. 3, 191-209. More details on such processes and on dye-providing substances can be found in the literature cited therein and in DE-A Nos. 1,095,115; 1,930,215; 1,772,929; 2,242,762; 2,505,248; 2,543,902; 2,645,656; and the Research Disclosures Nos. 15,157 (November 1976) and 15,654 (April 1977).

EP-A 0 250 658 in claim 1 discloses an image receiving material suitable for image production by dye diffusion transfer processing controlled by the development of (an) image-wise exposed silver halide emulsion layer(s), wherein the support of the material is a resin support coated with an image receiving layer containing gelatin in admixture with a cationic polymeric mordant containing glycidyl groups that can react with active hydrogen atoms of gelatin, characterized in that the support is substantially consisting of a vinyl chloride polymer and the image receiving layer coated thereon has a weight ratio of the polymeric mordant to gelatin from 25:1 to 2.5:1, the gelatin being present at a coverage of at least 0.1 g per $m^2$.

U.S. Pat. No. 4,820,608 discloses an image receptor element for dye diffusion transfer imaging processes comprising a support and an image-receiving layer incorporating a hydrophilic colloid, a non-polymeric phosphonium mordanting agent comprising at least one long chain hydrocarbon group and capable of fixing acid image dyes transferred to the image-receiving layer by diffusion, and a polymer comprising free acid groups, wherein the polymer is a copolymer latex comprising free weak acid groups and the image-receiving layer also comprises at least one heterocyclic compound corresponding to one of the following general formulae I, II, and III:

(I)

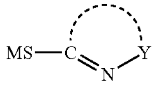

(II)

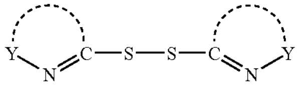

(III)

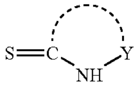

wherein: Y represents the non-metallic atoms needed to complete a saturated or unsaturated 5- or 6-membered heterocyclic nucleus, which may carry a fused-on aromatic ring system, and M represents hydrogen, an alkali metal atom, a quaternary ammonium group, or a negative charge forming an inner salt with a quaternized nitrogen atom of the heterocyclic compound.

The term “silver halide diffusion processes” refers to all black and white image-forming processes in which a positive is formed by diffusion reversal. The principles of the silver complex diffusion transfer reversal process, hereinafter called DTR process, have been described e.g. in U.S. Pat. No. 2,352,014 and in the book “Photographic Silver Halide Diffusion Processes” by André Rott and Edith Weyde, The Focal Press, London and New York, (1972). In the DTR process non developed silver halide of an information wise exposed photographic silver halide emulsion layer material is transformed with a so called silver halide solvent into soluble silver complex compounds which are allowed to diffuse into an image receiving element and are reduced therein with a developing agent, generally in the presence of physical development nuclei, to form a silver image having reversed image density values (“DTR image”) with respect to the black silver image obtained in the exposed areas of the photographic material.

U.S. Pat. No. 4,278,756 discloses a negative silver diffusion transfer process for making a reflective electrically nonconducting data storage medium from a photosensitive silver-halide emulsion comprising, defining at least one recording field in a photosensitive silver-halide emulsion, forming an area-wise surface latent image layer of silver precipitating nuclei by means of contacting the recording field of the photosensitive silver-halide emulsion with a fogging agent, said layer having a maximum nuclei volume concentration at one surface of the emulsion and a gradient in the depth-wise direction of decreasing concentration, contacting said photosensitive silver-halide emulsion with a reagent comprising a weak silver-halide developing agent for chemical development of said surface latent image layer of silver precipitating nuclei and a rapid-acting, silver-halide complexing solvent for reacting with unexposed and undeveloped silver halide to form soluble silver ion complexes which are transported by diffusion transfer to said chemically developed silver precipitating nuclei where silver of said silver ion complexes is precipitated and adsorbed on said chemically developed nuclei in the presence of said developing agent acting as a reducing agent, thereby forming a reflective, electrically nonconducting layer of aggregated and individual silver particles in the recording fields, the activity of solvent permitting chemical development of said surface latent image by the weak developing agent while simultaneously all of the undeveloped and unexposed silver halide is dissolved by the complexing agent.

U.S. Pat. No. 6,645,280 discloses an ink composition comprising a slow evaporating solvent and a translucentizing agent, wherein the ink composition is free or substantially free of colorants and is suitable for use in ink jet printing on paper substrates, and the slow evaporating solvent is present in an amount of from about 15% by weight to about 70% by weight of the ink composition, the translucentizing agent making the paper less opaque, and thus forming a visible image on the paper when viewed under light and typically, the translucentizing agent has a refractive index of from about 1.3 (±0.05) to about 1.7, and preferably from about 1.4 to about 1.6, at 20° C.

U.S. Pat. No. 6,358,596 discloses a cellulosic substrate having at least one transparentized portion formed therein, wherein said cellulosic substrate defines first and second major faces; said transparentized portion comprises a transparentizing composition applied to said cellulosic substrate in a predetermined pattern so as to define a graphical image having a relative transparency selected so as to define an area of increased transparency in said substrate; said area of increased transparency resembles a graphical watermark and defines a degree of transparency that excludes the degree of transparency defined by a transparent window; said transparentizing composition comprises a transparentizing agent and a security agent. The radiation curable transparentizing composition disclosed in U.S. Pat. No. 6,358,596 comprises at least one monomer selected from the group consisting of acrylate or methacrylate esters of polyhydroxy polyethers made from polyhydric alcohols (polyols) starting materials (compounds of Formula I) and/or acrylate or methacrylate esters of polyhydroxy polyethers made from primary or secondary amine starting materials (compounds of Formula II).

EP-A 1 362 710 discloses a method for producing a tamper proof carrier of information, said method comprising the following steps, in order: (1) providing a two-layer assemblage comprising (i) a rigid sheet or web support, and (ii) a porous opaque ink receiving layer comprising a pigment and a binder whereby either the surface of said support, or the surface of said opaque layer carries a first set of printed information, (2) printing a second set of information, different from said first set, onto said porous opaque ink receiving layer by means of ink jet printing, (3) covering totally, partially, or pattern-wise the thus obtained assemblage with a UV-curable lacquer composition, by means of coating, printing, spraying or jetting, whereby on penetration of the lacquer in said porous opaque ink receiving layer this layer becomes substantially transparent, (4) curing said lacquer composition by means of an overall UV exposure, thereby improving the adhesion between said support and said ink receiving layer, and the cohesive strength of said ink receiving layer.

EP-A 1 398 175 discloses four different embodiments of an information carrier. In the first embodiment the information carrier comprising: a rigid sheet or web support; an opaque porous receiving layer capable of being rendered substantially transparent by penetration by a lacquer, said receiving layer containing a pigment and a binder; an image provided onto and/or in said receiving layer; a cured pattern of a varnish provided onto said receiving layer provided with said image or onto and/or in said receiving layer provided with said image if said varnish is incapable of rendering said receiving layer transparent; and a cured layer of said lacquer provided on said receiving layer provided with said image and said cured pattern of said varnish, said lacquer having rendered said parts of said receiving layer in contact therewith substantially transparent, wherein said cured pattern of said varnish forms an opaque watermark. In the second embodiment the information carrier comprising: a rigid sheet or web support;

an opaque porous receiving layer capable of being rendered substantially transparent by penetration by a varnish, said receiving layer containing a pigment and a binder; an image provided onto and/or in said receiving layer; a cured pattern of said varnish provided in said receiving layer provided with said image; and a cured layer of a lacquer provided onto said receiving layer provided with said image and said cured pattern of said varnish, or onto and/or in said receiving layer provided with said image and said cured pattern of said varnish if said lacquer is incapable of rendering said receiving layer transparent, said varnish having rendered said parts of said receiving layer in contact therewith substantially transparent, wherein said cured pattern of said lacquer forms a substantially transparent watermark. In the third embodiment the information carrier comprising: a rigid sheet or web support; a transparent porous receiving layer capable of being rendered substantially opaque by penetration by a lacquer, said receiving layer containing a pigment and a binder; an image provided onto and/or in said receiving layer; a cured pattern of a varnish provided onto said receiving layer provided with said image, or onto and/or in said receiving layer provided with said image if said varnish is incapable of rendering said receiving layer opaque; and a cured layer of said lacquer provided on said receiving layer provided with said image and said cured pattern of said varnish, said lacquer having rendered said parts of said receiving layer in contact therewith substantially opaque, wherein said cured pattern of said varnish forms a transparent watermark. In the fourth embodiment the information carrier comprising: a rigid sheet or web support; a transparent porous receiving layer capable of being rendered substantially opaque by penetration by a varnish, said receiving layer containing a pigment and a binder; an image provided onto and/or in said receiving layer; a cured pattern of said varnish provided in said receiving layer provided with said image; and a cured layer of a lacquer provided onto said receiving layer provided with said image and said cured pattern of said varnish, or onto and/or in said receiving layer provided with said image and said cured pattern of said varnish if said lacquer is incapable of rendering said receiving layer opaque, said varnish having rendered said parts of said receiving layer in contact therewith substantially opaque, wherein said cured pattern of said lacquer forms a substantially opaque watermark.

GB 1 073 433 discloses the method of forming an image on a porous, opaque layer comprising applying an imaging material in imagewise configuration which is of similar refractive index to the opaque layer and reducing the viscosity of said imaging material so that it flows into the pores to fill the pores of said opaque layer to render said opaque layer clear in said image areas.

U.S. Pat. No. 4,252,601 discloses an information recording kit for making transparencies for projection of information or for making photographic negatives for reproductions comprising an opaque recording material, a writing liquid for recording information on the recording material and means for applying the writing liquid on the opaque recording material in the form of transparent lines wherein said recording material comprises a transparent backing sheet and an opaque layer adhered to one surface of said backing sheet, said opaque layer comprising a finely divided particulate organic styrene resin pigment uniformly distributed throughout a polyvinylidene chloride film-forming resin binder, said writing liquid comprising a solvent for the organic styrene resin pigment, whereby when said writing liquid is applied to said opaque layer according to a pattern of information the opaque layer becomes transparent to visible light according to said pattern.

WO 81/01389A1 discloses a self-supporting microvoid-containing sheet material which is substantially insensitive to marking by the localized application of heat or pressure but which is receptive to ink, pencil, crayon or similar markings and which is adapted to being temporarily or permanently provided with markings by the application of a colorless liquid, comprising in combination: a self-supporting base sheet and, bonded over at least one side of said base sheet, a reflective opaque white to pastel layer comprising particles bonded by a binder, said particles and binder both having a refractive index in the range of 1.3 to 2.2, interconnected microvoids being present throughout said layer, characterized in that the binder:particle volume ratio being in the range of about 1:20 to 2:3, so that the particles are held in pseudo-sintered juxtaposition, the void volume of the layer being in the range of 15-70%, said binder being thermoset, and layer having an image force of at least 200 grams-force.

U.S. Pat. No. 4,499,211 discloses a microporous molded article having an open-cell structure and comprising a thermoplastic material which possesses an inherent latent structural convertibility and includes effective pores of a diameter in the range from about 0.002 to 10 μm, said thermoplastic material comprising at least about 70 percent by weight of a terpolymer which is composed of from about 20 to 80 percent by weight, relative to the total weight of the terpolymer, of copolymerized fluorinated olefin selected from the group consisting of ethylene and propylene, up to about 40 percent by weight, relative to the total weight of the terpolymer, of copolymerized olefin selected from the group consisting of ethylene and propylene, and from about 80 to 20 percent by weight, relative to the total weight of the copolymer, of copolymerized vinyl acetate, with at least 5 percent of the total proportion of acetate groups contained in the copolymer being converted by saponification into OH groups after copolymerization of the specified comonomers to form the terpolymer.

EP-A 0 390 638 discloses a base sheet comprising a layer capable of becoming, in reversible manner, transparent by contact with a liquid, resistant to a marking by localized application of pressure and/or heat, characterized by the fact that it comprises: at least one flexible sheet, at least one layer applied in aqueous form on the flexible sheet and then dried, said sheet being microporous, opaque, and containing at least non-thermoset particles, at least one binder and optionally other additives.

JP 10-157280A discloses a recording material capable of being printed repeatedly by ink jet printing without deteriorating its recording performance even in the case of using many times by incorporating mat or porous surface and a solvent receiving layer which becomes opaque when no solvent exists and transparent when solvent is received.

U.S. Pat. No. 6,364,993 discloses a laminate comprising a substrate having a first substrate surface containing an image thereon and a polymeric film laminated to said first substrate surface overlying said image, said film containing an exposed water activatable opaque layer having a thickness ranging from about 0.6 mil to about 2.0 mil, said opaque layer derived from a coating formulation comprising from about 5 to about 40 wt. % aluminum silicate and from about 60 to about 95 wt. % binder, wherein the binder comprises a mixture of solvent, butyl acetate, ethylene glycol monobutyl ether and propylene glycol.

U.S. Pat. No. 6,723,383 discloses a process for producing a dry image comprising the steps of: (a) applying an opaque coating composition to the surface of a substrate to form an opaque coating on the substrate, wherein the surface is selected from the group consisting of a light-emitting surface, a reflective surface, a glossy surface, a luminescent surface, and a combination thereof; and (b) contacting the coated substrate with a recording liquid, wherein the opaque coating composition includes an opaque coating agent comprising a polymeric polyacid and a polymeric polybase, and wherein the opaque coating contacted with the recording liquid becomes transparent as a result of the contact.

WO 04/052655A1 discloses a multi-layer opaque and matte ink-jet recording medium, suitable for recording images with dye and pigmented inks, which goes through phase change from opaque to transparent and glossy in at least one printed area to reveal the surface of a substrate and thereby provide light-emitting, reflective, glossy, metallic-looking images or to show holographic images, wherein the recording medium comprises a substrate coated with at least two chemically layers comprising: (a) a first transparent ink-receptive layer comprising a polymeric binder and a cross-linker and optionally having a plasticizer and pigment particles such as alumina and silica coated over the substrate, wherein the cross-linker comprises an azetidinium polymer or a salt thereof, and/or a polyfunctional aziridine or a salt thereof, or a polyfunctional oxazoline and metallic salts; and (b) a second ink-receptive layer comprising an opaque or semi-opaque coating composition, wherein the opaque or semi-opaque coating composition is capable of accepting a printed image and thereby becoming semi-transparent or clearly transparent from application of ink-jet printing ink or similar inks, while presenting a light-emitting, reflective, glossy, metallic-looking or holographic or transparent image of high clarity and quality, wherein said first layer is located between said second layer and the substrate in said recording medium and the first and second layer are chemically coupled.

The inventions of EP-A 1 362 710 and EP-A 1 398 175 both disclose a porous opaque ink receiving layer comprising a pigment and a binder, which is capable of being transparentized with a UV-hardenable lacquer. Moreover, the adhesion of the porous opaque ink receiving to the contiguous layer or support is improved upon transparentization with the UV-hardenable lacquer implying diffusion of the UV-hardenable lacquer to the interface with the contiguous layer or support.

There is a need to extend the security possibilities for providing additional security features to the information carriers disclosed in EP-A 1 362 710 and EP-A 1 398 175. There is also the need for the possibility of personalizing the information carrier i.e. incorporating personal details of the information card carrier e.g. an image or other identification.

ASPECTS OF THE INVENTION

It is an aspect of the present invention to provide information carriers with transparentizable opaque porous layers with additional security features.

It is a further aspect of the present invention to provide information carriers with transparentizable opaque porous layers, which are capable of being individualized by the incorporation of details of the information bearer.

Further aspects and advantages of the present invention will become apparent from the description hereinafter.

SUMMARY OF THE INVENTION

Surprisingly it has been found that a receiving layer configuration comprising at least one layer, wherein at least one layer of the receiving layer configuration is opaque, pourers and has the capability of being rendered substantially transparent by penetration by a lacquer is, prior to transparentization with the lacquer, capable of transporting species which with species already present in one or more of the constituent receiving layers themselves or in a layer or support in diffusion contact with the receiving layer configuration can provide human-readable or machine-readable information, if either the diffusing species is applied information-wise to the outermost surface of the receiving layer configuration or the species already present in one or more of the constituent receiving layers or in a layer or support in diffusion contact with the receiving layer configuration is/are present in an information-wise pattern. The species already present in one or more of the constituent receiving layers or in a layer or support in diffusion contact with the receiving layer configuration can be a binding species, a catalytic species or a reacting species. An example of such a species is a mordant, which can bind a diffusing species reversibly or irreversibly in the latter case resulting in reaction between the mordant and the diffusing species. The diffusing species is/are a precursor(s) of the human-readable or machine detectable functional species. Different diffusing species can interact with a particular species or each can interact in situ with different species already present in the one or more of the constituent receiving layers themselves or in a layer or support in diffusion contact with the receiving layer configuration.

Aspects of the present invention are realized by an information carrier precursor comprising: a rigid sheet or support; a receiving layer configuration comprising at least one layer; and at least one substance, optionally provided pattern-wise, capable of and available for interacting in situ with at least one species diffusing through the receiving layer configuration to produce a functional species, wherein at least one layer of the receiving layer configuration is opaque, porous, has the capability of being rendered substantially transparent by penetration by a lacquer provided at the outermost surface of the receiving layer configuration and comprises at least one pigment and at least one binder.

Aspects of the present invention are also realized by a method for producing the above-mentioned information carrier precursor, the method comprising the steps of: optionally applying at least one layer to a rigid sheet or support thereby providing an outermost surface; and applying as a continuous or discontinuous layer or print in at least one application step a receiving layer configuration to a rigid sheet or support or the outermost surface of the optionally applied at least one layer, at least one substance capable of and available for interacting in situ with at least one species diffusing through the receiving layer configuration to produce a functional species being provided in at least one of the constituent receiving layers and the at least one optionally applied layer and rigid sheet or support in diffusion contact with the receiving layer configuration.

Aspects of the present invention are also realized by a method for producing an information carrier, the method comprising the following steps: (i) providing the above-mentioned information carrier precursor; (ii) applying a composition comprising at least one functional species or functional species precursor pattern-wise to the outermost surface of the receiving layer configuration to produce a pattern in the information carrier precursor; (iii) applying the transparentizing lacquer to at least part of the areas of the outermost surface of the receiving layer configuration corresponding to the porous parts of the at least one opaque, porous layer thereby transparentizing at least in part the parts of the at least one opaque, porous layer which are opaque and porous to which the transparentizing lacquer has been applied; (iv) optionally curing the transparentizing lacquer; (v) if there are parts of the layer which are opaque and porous after step (iv) applying non-transparentizing lacquer to the opaque and porous parts of the outermost layer of the receiving layer configuration thereby filling the pores of those parts of the receiving layer configuration to which the transparentizing lacquer had not been applied; and (vi) optionally curing the non-transparentizing lacquer.

Aspects of the present invention are also realized by an information carrier obtained according to the above-mentioned process.

Further aspects of the present invention are disclosed in the dependent claims.

DETAILED DESCRIPTION

Definitions

The term "information carrier precursor", as used in disclosing the present invention, means an intermediate product used in the realization of information carriers.

The term "receiving layer", as used in disclosing the present invention, means having the ability to receive ink-jet ink with rapid drying i.e. having sufficient porosity to wick away rapidly the ink-jet ink dispersion medium.

The term 'porous layer", as used in disclosing the present invention, means a layer with pores, which can be in the ingredients of the layer and/or in addition to the ingredients of the layer e.g. a layer containing a porous ingredient is a porous layer.

The term "diffusion inhibitor", as used in disclosing the present invention, means a substance which inhibits the transparentization of and hinders the diffusion of substances into opaque porous layers comprising at least one pigment and at least one binder and capable of transparentization with a lacquer.

The terms "opaque" and "non-transparent" layer, as used in disclosing the present invention, refer to a layer which is non-transparent. The term "white non-transparent film", as used in disclosing the present invention, means a white film capable of providing sufficient contrast to a transparent image to make the image clearly perceptible. A white non-transparent film can be an "opaque film", but need not necessarily be completely opaque in that there is no residual translucence i.e. no light penetration through the film. Optical density in transmission as measured with a MacBeth TR924 densitometer through a visible filter can provide a measure of the non-transparency of a film. ISO 2471 concerns the opacity of paper backing and is applicable when that property of a paper is involved that governs the extent to which one sheet visually obscures printed matter on underlying sheets of similar paper and defines opacity as "the ratio, expressed as a percentage, of the luminous reflectance factor of a single sheet of the paper with a black backing to the intrinsic luminous reflectance factor of the same sample with a white reflecting backing. 80 $g/m^2$ copy paper, for example, is white, non-transparent and has an optical density of 0.5 as measured with a MacBeth TR924 densitometer through a yellow filter according to ISO 5-2 and metallized films typically have an optical density ranging from 2.0 to 3.0. The opaque porous layers, used in the present invention, have very high haze values e.g. 98% indicating very high light scattering. A relative opacity can be defined by assigning a 100% opacity to the initial optical density measured under standard conditions with a black background, $D_{ref}$, and assigning a 0% opacity to complete transparentization under standard conditions with a black background, $D_{black}$, i.e. an optical density corresponding to a combination of the black background and the optical density of the support. The percentage opacity is then given by the expression: $(D_{black}-D_{observed})/(D_{black}-D_{ref})$ The term "substantially transparent", as used in disclosing the present invention, means having the property of transmitting at least 75% of the incident visible light without substantially diffusing it.

The term "transparentizing lacquer", as used in disclosing the present invention, means a liquid under the application conditions, which is transparent, comprises at least one polymer and/or at least one wax and/or at least one polymerizable substance (e.g. monomers and oligomers) and can solidify upon cooling, become solid upon evaporation of solvent or harden/cross-link upon exposure to heat, moisture or radiation e.g. visible light, UV-radiation and electron beams i.e. is curable which transparentizes the receiving layer configuration.

The term "non-transparentizing lacquer", as used in disclosing the present invention, means a liquid under the application conditions, which comprises at least one polymer and/or at least one wax and/or at least one polymerizable substance (e.g. monomers and oligomers) and can solidify upon cooling, become solid upon evaporation of solvent or harden/cross-link upon exposure to moisture or radiation e.g. visible light, UV-radiation and electron beams i.e. is curable which does not transparentize the receiving layer configuration.

The term "capability of being rendered substantially transparent by a lacquer", as used in disclosing the present invention, means that the receiving layer configuration at least becomes transparent upon penetration of the lacquer. This does not exclude the realization of transparency with water or a solvent, which provide transparentization for as long as the liquid remains in the pores i.e. provides a temporary transparentization.

The term "interacting" as used in disclosing the present invention, means capable of acting on at least one substance diffusing through porous parts of the receiving layer configuration e.g. by binding with, catalyzing or reacting with.

The term "binding", as used in disclosing the present invention, means capable of physically adsorbing at least one substance diffusing through porous parts of the receiving layer configuration i.e. without changing the chemical nature of the substance adsorbed.

The term 'catalyzing", as used in disclosing the present invention, means capable of promoting a reaction between molecules of at least one substance diffusing through porous parts of the receiving layer configuration e.g. in processes such as the electroless deposition of metals.

The term "reacting", as used in disclosing the present invention, means capable of reacting with at least one substance diffusing through porous parts of the receiving layer configuration to produce different chemical species.

The term "mordant", as used in disclosing the present invention, means a substance capable of binding or fixing, i.e. providing preferential adsorption for, at least one functional species.

The term "functional species", as used in disclosing the present invention, means a species having functional properties such that it can be detected either visually with or without assistance of an appropriate light source or with detection apparatus i.e. is human or machine readable. Such functional species can, for example, be used in realizing a security feature. Examples of such functional species are infrared-absorbing species, metals, luminescing organic or organometallic species and dyes. The dyes can, for example, provide an image of a person to whom the information carrier belongs or has been assigned or other image as required.

The terms “on”, “onto” and “in”, as used in disclosing the present invention, have very precise meanings with respect to a layer: “on” means that penetration of the layer may or may not occur, “onto” means at least 90% on the top of i.e. there is no substantial penetration into the layer, and “in” means that penetration into the respective layer or layers occurs. With printing digitally stored information “onto” a porous receiving layer configuration, we understand that an image is provided “on and/or in” the receiving layer configuration. In the case of ink jet printing, if the ink remains on top of the receiving layer configuration, the image is provided “onto” the receiving layer configuration. If the ink penetrates into the porous receiving layer configuration, it is “in” the layer. The same terminology is used for the varnish and the lacquer. For example, under “before substantial penetration of the varnish in the receiving layer configuration”, it is understood that $\leqq$10% of the varnish is located “in” the receiving layer configuration.

The term “conventional printing process”, as used in disclosing the present invention refers to impact printing processes as well as to non-impact printing processes applied both to the printing of graphics and to the printing of functional patterns e.g. a conductive pattern. The term includes but is not restricted to ink-jet printing, intaglio printing, screen printing, flexographic printing, driographic printing, electrophotographic printing, electrographic printing, offset printing, stamp printing, gravure printing, thermal and laser-induced processes and also includes a printing process rendering areas of a conductive layer non-conductive in a single pass process, such as disclosed in EP 1 054 414A and WO 03/025953A, but excludes processes such as evaporation, etching, diffusion processes used in the production of conventional electronics e.g. silicon-based electronics.

The term “impact printing process”, as used in disclosing the present invention, means a printing process in which contact is made between the medium in which the print is produced and the printing system e.g. printers that work by striking an ink ribbon such as daisy-wheel, dot-matrix and line printers, diffusion transfer processes (e.g. COPYCOLOR® materials from AGFA-GEVAERT) and direct thermal printers in which the thermographic material is printed by direct contact with heating elements in a thermal head and printers in which a master is covered with an ink layer on areas corresponding to a desired image or shape, after which the ink is transferred to the medium, such as offset, gravure or flexographic printing.

The term “non-impact printing process”, as used in disclosing the present invention, means a printing process in which no contact is made between the medium in which the print is produced and the printing system e.g. electrographic printers, electrophotographic printers, laser printers, ink jet printers in which prints are produced without needing to strike the print medium.

The term ‘pattern”, as used in disclosing the present invention, includes holograms, images, representations, guilloches, graphics and regular and irregular arrays of symbols, images, geometric shapes and non-geometric shapes and can consist of pixels, continuous tone, lines, geometric shapes and/or any random configuration.

The term “pattern-wise”, as used in disclosing the present invention, means as a pattern and embraces the term image-wise.

The term “coloured image”, as used in disclosing the present invention, is an image produced with one or more colorants and which in the case of the colour black is produced by a combination of at least two colorants unless specifically applied as a non-visible light transparent pattern.

The term “colorant”, as used in disclosing the present invention, means a substance absorbing in the visible spectrum between 400 nm and 700 nm.

The term “dye”, as used in disclosing the present invention, means a colouring agent having a solubility of 10 mg/L or more in the medium in which it is applied and under the ambient conditions pertaining.

The term “pigment”, as used in disclosing the present invention, is defined in DIN 55943, herein incorporated by reference, as an inorganic or organic, chromatic or achromatic colouring agent that is practically insoluble in the application medium under the pertaining ambient conditions, hence having a solubility of less than 10 mg/L therein.

The term security print, as used in disclosing the present invention, means a printed image or pattern designed to be difficult to counterfeit and hence providing a security feature.

The term “layer”, as used in disclosing the present invention, means a coating covering the whole area of the entity referred to e.g. a support.

The term “discontinuous layer”, as used in disclosing the present invention, means a coating not covering the whole area of the entity referred to e.g. a support.

PET is an abbreviation for polyethylene terephthalate.

PETG is an abbreviation for polyethylene terephthalate glycol, the glycol indicating glycol modifiers i.e. partial replacement of ethylene glycol by alternative glycols such as 1,4-cyclohexane-dimethanol or neopentyl glycol which minimize brittleness and premature aging that occur if unmodified amorphous polyethylene terephthalate (APET) is used in the production of cards.

Information Carrier Precursor

Aspects of the present invention are realized by an information carrier precursor comprising: a rigid sheet or support; a receiving layer configuration comprising at least one layer; and at least one substance, optionally provided pattern-wise, capable of and available for interacting in situ with at least one species diffusing through the receiving layer configuration to produce a functional species, wherein at least one layer of the receiving layer configuration is opaque, porous, has the capability of being rendered substantially transparent by penetration by a lacquer provided at the outermost surface of the receiving layer configuration and comprises at least one pigment and at least one binder. The species, singular or plural, diffusing through the receiving layer configuration can itself/themselves be (a) species which is/are visually detectable once the diffusion process is completed e.g. by binding by a substance, as used in the present invention, i.e. is human readable, can be detected by the use of light via fluorescence or phosphorescence i.e. human readable with the assistance of an appropriate light source or are machine readable e.g. electrically or magnetically. Alternatively the species diffusing through the receiving layer configuration is/are (a) functional species precursor(s) which are catalyzed by or react with at least one species in the information carrier precursor to produce at least one species which is visually detectable once the reaction is completed i.e. is human readable, can be detected by the use of light via fluorescence or phosphorescence i.e. human readable with the assistance of an appropriate light source or is machine readable e.g. electrically or magnetically.

Aspects of the present invention are also realized by a third information carrier precursor comprising: a rigid sheet or support; a receiving layer configuration comprising at least one layer; and at least one mordant capable of binding in situ a functional species and/or a component capable of catalyzing the formation in situ of a functional species and/or a species capable with a precursor of a functional species of producing in situ a functional species, these species all optionally provided pattern-wise, wherein at least one layer of the receiving layer configuration is opaque, porous, has the capability of being rendered substantially transparent by penetration by a lacquer provided at the outermost surface of the receiving layer configuration and comprises at least one pigment and at least one binder.

According to a first embodiment of the information carrier precursor, according to the present invention, the at least one substance capable of and available for interacting in situ with at least one species diffusing through the receiving layer configuration to produce a functional species is capable of and available for binding and/or is capable of and available for catalyzing and/or is capable of and available for reacting with at least one species diffusing through the receiving layer configuration.

According to a second embodiment of the information carrier precursor, according to the present invention, the at least one substance is homogeneously or pattern-wise distributed in said receiving layer configuration.

According to a third embodiment of the information carrier precursor, according to the present invention, the at least one substance is present in at least one layer or pattern adjacent to or contiguous with the receiving layer configuration.

According to a fourth embodiment of the information carrier precursor, according to the present invention, the at least one substance is homogeneously or pattern-wise distributed in the receiving layer configuration and the at least one substance is present in at least one layer or pattern adjacent to or contiguous with said receiving layer configuration, the substance or substances in the receiving layer configuration and in said at least one layer or pattern adjacent to or contiguous with said receiving layer configuration being the same or different.

According to a fifth embodiment of the information carrier precursor, according to the present invention, the information carrier precursor further comprises at least one substance, optionally provided pattern-wise, capable of and available for interacting in situ with at least one species diffusing through the information carrier precursor to produce a functional species, wherein the at least one substance is homogeneously or pattern-wise distributed in said at least one receiving layer of the receiving layer configuration.

According to a sixth embodiment of the information carrier precursor, according to the present invention, the information carrier precursor further comprises at least one substance, optionally provided pattern-wise, capable of and available for interacting in situ with at least one species diffusing through the information carrier precursor to produce a functional species, wherein the at least one substance is present in at least one layer or pattern adjacent to or contiguous with the receiving layer configuration.

According to a seventh embodiment of the information carrier precursor, according to the present invention, the rigid sheet or support is preprinted with a security print, e.g. guilloches, graphics, regular and irregular arrays of symbols, geometric shapes, and non-geometric shapes or a random configuration as obtained by rainbow or iris printing, or a non-printed security feature.

The security print may, for instance, include a concrete recognizable design, or an abstract periodically repeating monochrome or multichrome pattern, or a gradually changing colour pattern, which gradually changes in hue and/or density of the colours, and is in this way difficult to counterfeit. Preferably the spectral characteristics of the inks of the security print are chosen so that they are difficult to copy by means of a commercial colour copier. This security print may further contain e.g. a logo, name or abbreviation of the issuing authority of the information carrier. This security print can be applied by any known printing technique, e.g. letterpress, lithographic printing, gravure printing, intaglio printing, iris printing, rainbow printing, silk screen printing, etc. A preferred technique is driographic printing being a waterless variant of lithographic printing whereby no fountain solution is applied to the printing press.

According to an eighth embodiment of the information carrier precursor, according to the present invention, the information carrier precursor further comprises an opaque element non-contiguous with the receiving layer configuration.

According to a ninth embodiment of the information carrier precursor, according to the present invention, the information carrier precursor further comprises an opaque element non-contiguous with the receiving layer configuration which is preprinted with a so-called security print. The security print may, for instance, include a concrete recognizable design, or an abstract periodically repeating monochrome or multichrome pattern, or a gradually changing colour pattern, which gradually changes in hue and/or density of the colours, and is in this way difficult to counterfeit. Preferably the spectral characteristics of the inks of the security print are chosen so that they are difficult to copy by means of a commercial colour copier. This security print may further contain e.g. a logo, name or abbreviation of the issuing authority of the information carrier. This security print can be applied by any known printing technique, e.g. letterpress, lithographic printing, gravure printing, silk screen printing, etc. A preferred technique is driographic printing being a waterless variant of lithographic printing whereby no fountain solution is applied to the printing press.

Diffusion Inhibitor

According to a tenth embodiment of the information carrier precursor, according to the present invention, the at least one opaque, porous layer further comprises a pattern-wise applied diffusion inhibitor. The diffusion inhibition can be partial or total and can be permanent or temporary. Examples of suitable diffusion inhibitors are liquids which fill the pores and which can be removed by evaporation, surface-active liquids, functional ingredients, such as fluorescent or phosphorescent compounds or fibres, and pigmented inks, particularly phase-change inks, the degree of pigmentation and the degree of penetration determining the degree of inhibition. The affinity of the particle ink type used may play a role in the penetration speed. For instance, a hydrophobic oil based ink will slower penetrate a rather hydrophilic receiving layer configuration, such as a silica containing layer, than an aqueous hydrophilic ink. Transparentization inhibitors are a particular type of diffusion inhibitor which specifically prevent penetration of transparentization liquids into the open pigment pores which provide the opacity of opaque transparentizable receiving layers containing at least one pigment and at least one binder.

According to an eleventh embodiment of the information carrier precursor, according to the present invention, the receiving layer configuration further includes a pattern-wise applied diffusion inhibitor selected from the group consisting of non-ionic silicones substituted with a polyalkyleneoxy-group, anionic surfactants having a fluoroalkyl-group with at least 7 carbon atoms and/or an alkyl group with at least 10 carbon atoms and/or an alkenyl group with at least 10 carbon atoms and/or two alkyl groups with at least 8 carbon atoms and cationic surfactants having a fluoroalkyl-group with at least 7 carbon atoms and/or an alkyl group with at least 10 carbon atoms and/or two alkyl groups with at least 8 carbon atoms.

The term "diffusion inhibitor", as used in disclosing the present invention, means a substance which inhibits the transparentization of and hinders the diffusion of substances into opaque porous layers comprising at least one pigment and at least one binder and capable of transparentization with a lacquer, the substance being preferably a non-polymeric compound.

According to a twelfth embodiment of the information carrier precursor, according to the present invention, the receiving layer configuration further includes a pattern-wise applied diffusion inhibitor selected from the group consisting of tetra-alkylammonium salts with at least one alkyl group with 10 or more carbon atoms; tetra-alkylammonium salts with a counterion with a alkyl or fluoroalkyl group with 8 or more carbon atoms; alkylphenylsulphonates with a carbon chain with at least 10 carbon atoms; fluorocarboxylic acids with at least 8 carbon atoms and salts thereof; sulphates with an alkyl group with at least 10 carbon atoms; heterocyclic sulphonates linked with alkyl groups having at least 10 carbon atoms and salts thereof; acid amide sulphonates of carboxylic acids with at least 12 carbon atoms and salts thereof; and silicones substituted with a polyalkyleneoxy-group.

According to a thirteenth embodiment of the information carrier precursor, according to the present invention, the receiving layer configuration further includes a pattern-wise applied diffusion inhibitor according to formula (I):

(I)

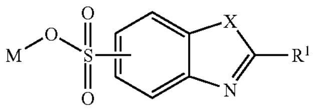

wherein M is hydrogen, an alkali atom or an ammonium group; $R^1$ is an alkyl, alkenyl-, alkynyl-, thioalkyl-, thioalkenyl- or thioalkynyl-group in which the alkyl-, alkenyl- or alkynyl-group has 6 to 25 carbon atoms; X is —O—, —S— or —N($R^2$)—; and $R^2$ is hydrogen, a

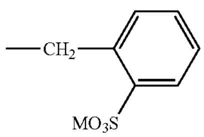

—$(CH_2)_m SO_3M$ group or a group; and m is an integer between 1 and 5, with in a preferred embodiment $R^1$ being a dodecyl, a tridecyl, a tetradecyl, a pentadecyl, a hexadecyl, a heptadecyl or an octadecyl group and in a particularly preferred embodiment $R^1$ being a dodecyl, a tridecyl, a tetradecyl, a pentadecyl, a hexadecyl, a heptadecyl or an octadecyl group and $R^2$ being a —$(CH_2)_m SO_3M$ group.

According to a fourteenth embodiment of the information carrier precursor, according to the present invention, the receiving layer configuration further includes a pattern-wise applied diffusion inhibitor represented by formula (II):

(II)

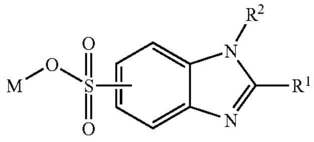

wherein M is hydrogen, an alkali atom or an ammonium group; $R^1$ is an alkyl, alkenyl-, alkynyl-, thioalkyl-, thioalkenyl- or thioalkynyl-group in which the alkyl-, alkenyl- or alkynyl-group has 6 to 25 carbon atoms; $R^2$ is hydrogen, a —$(CH_2)_m SO_3M$ group or a

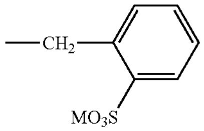

group; and m is an integer between 1 and 5.

According to a fifteenth embodiment of the information carrier precursor, according to the present invention, the receiving layer configuration further includes a pattern-wise applied diffusion inhibitor represented by formula (III):

(III)

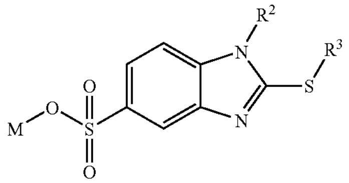

at least one compound represented by formula (IV):

(IV)

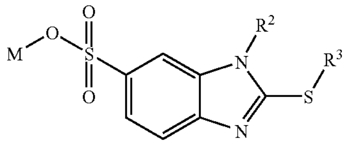

or a mixture of at least one compound represented by formula (III) with at least one compound represented by formula (IV), wherein M is hydrogen, an alkali atom or an ammonium group; $R^3$ is an alkyl, alkenyl or alkynyl group having 6 to 25 carbon atoms;

$R^2$ is hydrogen, a —$(CH_2)_m SO_3M$ group or a

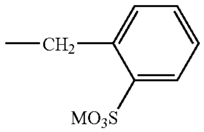

group; and m is an integer between 1 and 5.

Suitable compounds include compound such as:
| INHIBITOR nr | | |
|---|---|---|
| 01 | Ambiteric H from AGFA-GEVAERT | 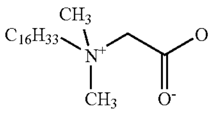 |
| 02 | Cetyltri-methyl-ammonium bromide | 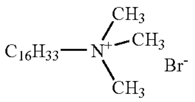 |
| 03 | Dow Corning 190 from Dow Corning | 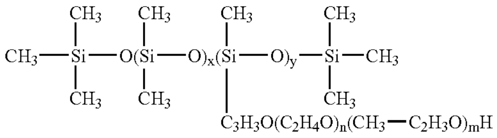 |
| 04 | FT 248 from BAYER | 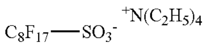 |
| 05 | Hostapon T from Clariant | 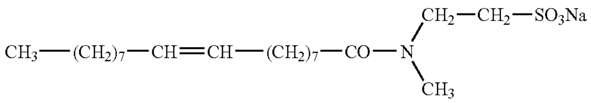 |
| 06 | Marlon A 365 from HULS | 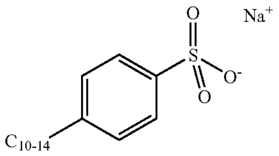 |
| 07 | Perfluoro-octanoic acid | 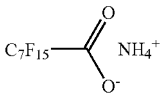 |
| 08 | Centrimide BP from SAF Bulk Chemicals | 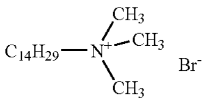 |
| 09 | Bardac LF from Lonza | 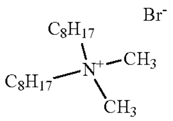 |
| 10 | Bardac 22 from Lonza | 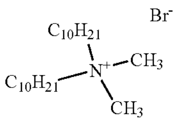 |
| 11 | Benzylcetyldi-methylammonium chloride | 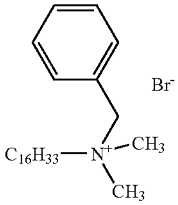 |

-continued

| INHIBITOR nr | | |
|---|---|---|
| 12 | Benzyllauryldi-methylammonium chloride | 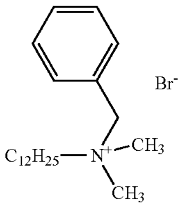 |
| 13 | Benzylmyristyldi-methylammonium chloride | 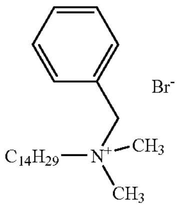 |
| 14 | Dowfax 2A1 from Dow Corning | 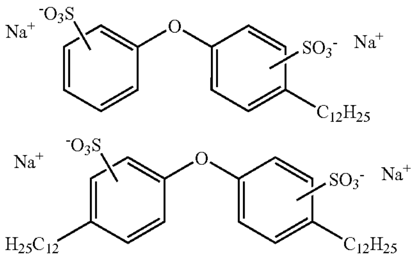 |
| 15 | Dowfax 3B2 from Dow Corning | 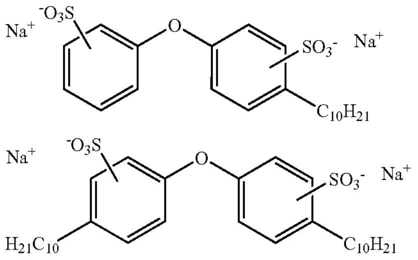 |
| 16 | Empicol ESA from Albright & Wilson | 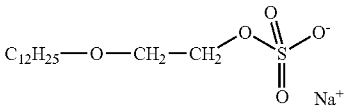 |
| 17 | Empicol ESB70 from Albright & Wilson | 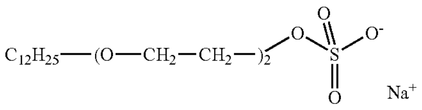 |
| 18 | Empicol ESC70 from Albright & Wilson | 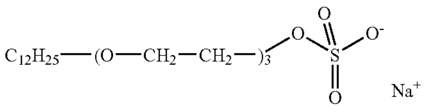 |
| 19 | Fluorad FC 129 from 3M Company | 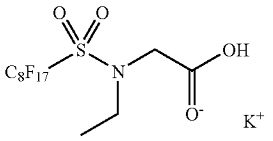 |
| 20 | Genapol 3520 from Clariant | Dioctyldimethylammonium chloride |
| 21 | | Lauryltrimethylammonium bromide |

-continued

| INHIBITOR nr | | |
|---|---|---|
| 22 | Preventol R 50 from BAYER | 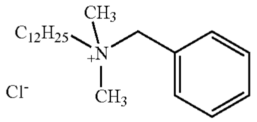 |
| 23 | Radufon DP from Air Products | 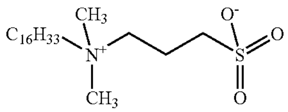 |
| 24 | Rewoterie AM CAS from Witco Surfactants GmbH | 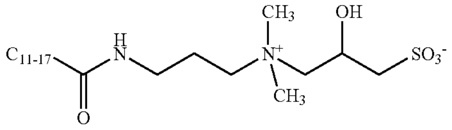 |
| 25 | Dodecyl sulphate, sodium salt | 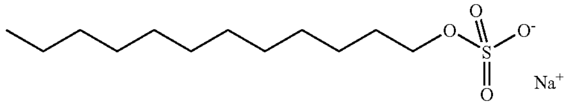 |
| 26 | | 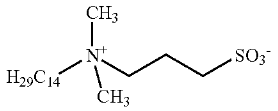 |

2-alkyl-benzimidazole-sulphonic acid compounds such as:

| INHIBITOR nr. | |
|---|---|
| 27 | 2-dodecyl,3-sulphobutyl-benzimidazole-6-sulphonic acid |
| 28 | 2-dodecyl,3-sulphobutyl-benzimidazole-6-sulphonic acid potassium salt |
| 29 | 2-dodecyl,3-sulphobutyl-benzimidazole-5-sulphonic acid |
| 30 | 2-dodecyl,3-sulphobutyl-benzimidazole-5-sulphonic acid potassium salt |
| 31 | 2-pentadecyl,3-sulphobutyl-benzimidazole-6-sulphonic acid |
| 32 | 2-pentadecyl,3-sulphobutyl-benzimidazole-6-sulphonic acid potassium salt |
| 33 | 2-pentadecyl,3-sulphobutyl-benzimidazole-5-sulphonic acid |
| 34 | 2-pentadecyl,3-sulphobutyl-benzimidazole-5-sulphonic acid potassium salt |
| 35 | 2-hexadecyl,3-sulphobutyl-benzimidazole-6-sulphonic acid |
| 36 | 2-hexadecyl,3-sulphobutyl-benzimidazole-6-sulphonic acid potassium salt |
| 37 | 2-hexadecyl,3-sulphobutyl-benzimidazole-5-sulphonic acid |
| 38 | 2-hexadecyl,3-sulphobutyl-benzimidazole-5-sulphonic acid potassium salt |
| 39 | 2-heptadecyl,3-sulphobutyl-benzimidazole-6-sulphonic acid |
| 40 | 2-heptadecyl,3-sulphobutyl-benzimidazole-6-sulphonic acid potassium salt |
| 41 | 2-heptadecyl,3-sulphobutyl-benzimidazole-5-sulphonic acid |
| 42 | 2-heptadecyl,3-sulphobutyl-benzimidazole-5-sulphonic acid potassium salt |
| 43 | 2-dodecyl-benzimidazole-6-sulphonic acid (tautomeric with 19) |
| 44 | 2-dodecyl-benzimidazole-6-sulphonic acid sodium salt (tautomeric with 20) |
| 45 | 2-dodecyl-benzimidazole-5-sulphonic acid (tautomeric with 17) |
| 46 | 2-dodecyl,5-sulpho-benzimidazole-5-sulphonic acid sodium salt (tautomeric with 18) |
| 47 | 2-pentadecyl-benzimidazole-6-sulphonic acid (tautomeric with 23) |
| 48 | 2-pentadecyl-benzimidazole-6-sulphonic acid sodium salt (tautomeric with 24) |

-continued

| INHIBITOR nr. | |
|---|---|
| 49 | 2-pentadecyl-benzimidazole-5-sulphonic acid (tautomeric with 21) |
| 50 | 2-pentadecyl-benzimidazole-5-sulphonic acid sodium salt (tautomeric with 22) |
| 51 | 2-hexadecyl-benzimidazole-6-sulphonic acid (tautomeric with 27) |
| 52 | 2-hexadecyl-benzimidazole-6-sulphonic acid sodium salt (tautomeric with 28) |
| 53 | 2-hexadecyl-benzimidazole-5-sulphonic acid (tautomeric with 25) |
| 54 | 2-hexadecyl-benzimidazole-5-sulphonic acid sodium salt tautomeric with 26) |
| 55 | 2-heptadecyl-benzimidazole-6-sulphonic acid (tautomeric with 31) |
| 56 | 2-heptadecyl-benzimidazole-6-sulphonic acid sodium salt (tautomeric with 32) |
| 57 | 2-heptadecyl-benzimidazole-5-sulphonic acid (tautomeric with 29) |
| 58 | 2-heptadecyl-benzimidazole-5-sulphonic acid sodium salt (tautomeric with 30) |

and 2-thioalkyl-benzimidazole-sulphonic acid compounds such as:

| | INHIBITOR nr | |
|---|---|---|
| 59 | 2-thiododecyl-benzimidazole-5-sulphonic acid (tautomeric with 03) | 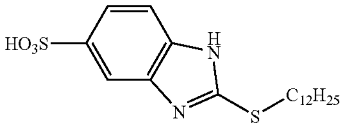 |
| 60 | 2-thiododecyl-benzimidazole-5-sulphonic acid sodium salt (tautomeric with 04) | |
| 61 | 2-thiododecyl-benzimidazole-6-sulphonic acid (tautomeric with 01) | |
| 62 | 2-thiododecyl-benzimidazole-6-sulphonic acid sodium salt (tautomeric with 02) | |
| 63 | 2-thiopentadecyl-benzimidazole-5-sulphonic acid (tautomeric with 07) | |
| 64 | 2-thiopentadecyl-benzimidazole-5-sulphonic acid sodium salt (tautomeric with 08) | |
| 65 | 2-thiopentadecyl-benzimidazole-6-sulphonic acid (tautomeric with 05) | |
| 66 | 2-thiopentadecyl-benzimidazole-6-sulphonic acid sodium salt (tautomeric with 06) | |
| 67 | 2-thiohexadecyl-benzimidazole-5-sulphonic acid (tautomeric with 11) | |
| 68 | 2-thiohexadecyl-benzimidazole-5-sulphonic acid sodium salt (tautomeric 12) | |
| 69 | 2-thiohexadecyl-benzimidazole-6-sulphonic acid (tautomeric with 09) | |
| 70 | 2-thiohexadecyl-benzimidazole-6-sulphonic acid sodium salt (tautomeric with 10) | |
| 71 | 2-thioheptadecyl-benzimidazole-5-sulphonic acid (tautomeric with 15) | |
| 72 | 2-thioheptadecyl-benzimidazole-5-sulphonic acid sodium salt (tautomeric with 16) | |
| 73 | 2-thioheptadecyl-benzimidazole-6-sulphonic acid (tautomeric with 13) | |
| 74 | 2-thioheptadecyl-benzimidazole-6-sulphonic acid sodium salt (tautomeric with 14) | |
| 75 | 2-thiododecyl, 3-sulphopentyl-benzimidazole-5-sulphonic acid | |
| 76 | 2-thiododecyl, 3-sulphopentyl-benzimidazole-5-sulphonic acid sodium salt | |
| 77 | 2-thiododecyl, 3-sulphopentyl-benzimidazole-6-sulphonic acid | |
| 78 | 2-thiododecyl, 3-sulphopentyl-benzimidazole-6-sulphonic acid sodium salt | |
| 79 | 2-thiopentadecyl, 3-sulpho-pentyl-benzimidazole-5-sulphonic acid | |
| 80 | 2-thiopentadecyl, 3-sulphopentyl-benzimidazole-5-sulphonic acid potassium salt | |
| 81 | 2-thiopentadecyl, 3-sulpho-pentyl-benzimidazole-6-sulphonic acid | |
| 82 | 2-thiopentadecyl, 3-sulphopentyl-benzimidazole-6-sulphonic acid potassium salt | |
| 83 | 2-thiohexadecyl, 3-sulpho-pentyl-benzimidazole-5-sulphonic acid | |
| 84 | 2-thiohexadecyl, 3-sulphopentyl-benzimidazole-5-sulphonic acid potassium salt | |
| 85 | 2-thiohexadecyl, 3-sulpho-pentyl-benzimidazole-6-sulphonic acid | |
| 86 | 2-thiohexadecyl, 3-sulphopentyl-benzimidazole-6-sulphonic acid potassium salt | |
| 87 | 2-thioheptadecyl, 3-sulpho-pentyl-benzimidazole-5-sulphonic acid | |
| 88 | 2-thioheptadecyl, 3-sulphopentyl-benzimidazole-5-sulphonic acid potassium salt | |

-continued

| INHIBITOR nr | | |
|---|---|---|
| 89 | 2-thioheptadecyl, 3-sulpho-pentyl-benzimidazole-6-sulphonic acid | |
| 90 | 2-thioheptadecyl, 3-sulphopentyl-benzimidazole-6-sulphonic acid potassium salt | |
| 91 | 2-thiododecyl, 3-sulphobutyl-benzimidazole-5-sulphonic acid | |
| 92 | 2-thiododecyl, 3-sulphobutyl-benzimidazole-5-sulphonic acid potassium salt | |
| 93 | 2-thiododecyl, 3-sulphobutyl-benzimidazole-6-sulphonic acid | |
| 94 | 2-thiododecyl, 3-sulphobutyl-benzimidazole-6-sulphonic acid sodium salt | 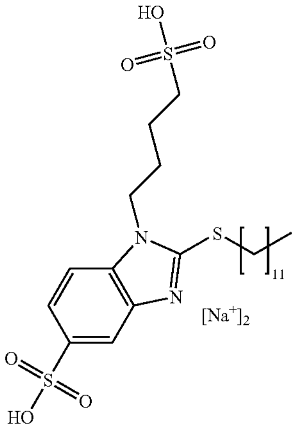 |
| 95 | 2-thiododecyl, 3-sulphobutyl-benzimidazole-6-sulphonic acid potassium salt | |
| 96 | 2-thiopentadecyl, 3-sulpho-butyl-benzimidazole-5-sulphonic acid | |
| 97 | 2-thiopentadecyl, 3-sulphobutyl-benzimidazole-5-sulphonic acid potassium salt | |
| 98 | 2-thiopentadecyl, 3-sulpho-butyl-benzimidazole-6-sulphonic acid | |
| 99 | 2-thiopentadecyl, 3-sulphobutyl-benzimidazole-6-sulphonic acid potassium salt | |
| 100 | 2-thiohexadecyl, 3-sulpho-butyl-benzimidazole-5-sulphonic acid | |
| 101 | 2-thiohexadecyl, 3-sulphobutyl-benzimidazole-5-sulphonic acid sodium salt | |
| 102 | 2-thiohexadecyl, 3-sulpho-butyl-benzimidazole-5-sulphonic acid potassium salt | |
| 103 | 2-thiohexadecyl, 3-sulphobutyl-benzimidazole-6-sulphonic acid | |
| 104 | 2-thiohexadecyl, 3-sulphobutyl-benzimidazole-6-sulphonic acid sodium salt | 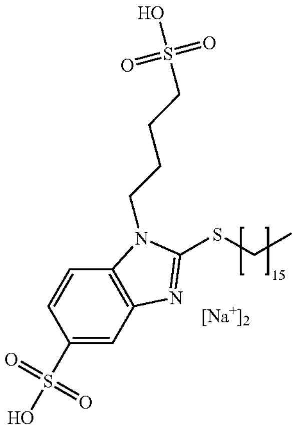 |

-continued

| INHIBITOR nr | |
|---|---|
| 105 | 2-thiohexadecyl, 3-sulphobutyl-benzimidazole-6-sulphonic acid potassium salt |
| 106 | 2-thioheptadecyl, 3-sulpho-butyl-benzimidazole-5-sulphonic acid |
| 107 | 2-thioheptadecyl, 3-sulphobutyl-benzimidazole-5-sulphonic acid sodium salt |
| 108 | 2-thioheptadecyl, 3-sulpho-butyl-benzimidazole-5-sulphonic acid potassium salt |
| 109 | 2-thioheptadecyl, 3-sulpho-butyl-benzimidazole-6-sulphonic acid |
| 110 | 2-thioheptadecyl, 3-sulphobutyl-benzimidazole-6-sulphonic acid potassium salt |
| 111 | 2-thiododecyl, 3-sulphopropyl-benzimidazole-5-sulphonic acid |
| 112 | 2-thiododecyl, 3-sulphopropyl-benzimidazole-5-sulphonic acid sodium salt |
| 113 | 2-thiododecyl, 3-sulphopropyl-benzimidazole-5-sulphonic acid potassium salt |
| 114 | 2-thiododecyl, 3-sulphopropyl-benzimidazole-6-sulphonic acid |
| 115 | 2-thiododecyl, 3-sulphopropyl-benzimidazole-6-sulphonic acid potassium salt |
| 116 | 2-thiododecyl, 3-sulphopropyl-benzimidazole-6-sulphonic acid sodium salt |
| 117 | 2-thiopentadecyl, 3-sulpho-propyl-benzimidazole-5-sulphonic acid |
| 118 | 2-thiopentadecyl, 3-sulphopropyl-benzimidazole-5-sulphonic acid potassium salt |
| 119 | 2-thiopentadecyl, 3-sulpho-propyl-benzimidazole-6-sulphonic acid |
| 120 | 2-thiopentadecyl, 3-sulphopropyl-benzimidazole-6-sulphonic acid potassium salt |
| 121 | 2-thiohexadecyl, 3-sulpho-propyl-benzimidazole-5-sulphonic acid |
| 122 | 2-thiohexadecyl, 3-sulphopropyl-benzimidazole-5-sulphonic acid potassium salt |
| 123 | 2-thiohexadecyl, 3-sulphopropyl-benzimidazole-5-sulphonic acid sodium salt |
| 124 | 2-thiohexadecyl, 3-sulphopropyl-benzimidazole-6-sulphonic acid |
| 125 | 2-thiohexadecyl, 3-sulphopropyl-benzimidazole-6-sulphonic acid potassium salt |
| 126 | 2-thioheptadecyl, 3-sulpho-propyl-benzimidazole-5-sulphonic acid |
| 127 | 2-thioheptadecyl, 3-sulphopropyl-benzimidazole-5-sulphonic acid potassium salt |
| 128 | 2-thioheptadecyl, 3-sulpho-propyl-benzimidazole-6-sulphonic acid |
| 129 | 2-thioheptadecyl, 3-sulphopropyl-benzimidazole-6-sulphonic acid potassium salt |
| 130 | 2-thiododecyl, 3-sulphoethyl-benzimidazole-5-sulphonic acid |
| 131 | 2-thiododecyl, 3-sulphoethyl-benzimidazole-5-sulphonic acid potassium salt |
| 132 | 2-thiododecyl, 3-sulphoethyl-benzimidazole-6-sulphonic acid |
| 133 | 2-thiododecyl, 3-sulphoethyl-benzimidazole-6-sulphonic acid potassium salt |
| 134 | 2-thiopentadecyl, 3-sulpho-ethyl-benzimidazole-5-sulphonic acid |

-continued

| INHIBITOR nr | |
|---|---|
| 135 | 2-thiopentadecyl, 3-sulphoethyl-benzimidazole-5-sulphonic acid potassium salt |
| 136 | 2-thiopentadecyl, 3-sulpho-ethyl-benzimidazole-6-sulphonic acid |
| 137 | 2-thiopentadecyl, 3-sulphoethyl-benzimidazole-6-sulphonic acid potassium salt |
| 138 | 2-thiohexadecyl, 3-sulpho-ethyl-benzimidazole-5-sulphonic acid |
| 139 | 2-thiohexadecyl, 3-sulphoethyl-benzimidazole-6-sulphonic acid |
| 140 | 2-thiohexadecyl, 3-sulphoethyl-benzimidazole-6-sulphonic acid potassium salt |
| 141 | 2-thioheptadecyl, 3-sulpho-ethyl-benzimidazole-5-sulphonic acid |
| 142 | 2-thioheptadecyl, 3-sulphoethyl-benzimidazole-5-sulphonic acid potassium salt |
| 143 | 2-thioheptadecyl, 3-sulpho-ethyl-benzimidazole-6-sulphonic acid |
| 144 | 2-thioheptadecyl, 3-sulphoethyl-benzimidazole-6-sulphonic acid potassium salt |

The synthesis of 2-alkyl-benzimidazole-sulphonic acid compounds and 2-thioalkyl-benzimidazole-sulphonic acid compounds is disclosed in EP-A 1 484 323 and EP-A 1 1 484 640.

Substance Capable of and Available for Binding with at Least One Species Diffusing Through the Receiving Layer Configuration According to a sixteenth embodiment of the information carrier precursor, according to the present invention, the at least one substance capable of and available for binding at least one species diffusing through the receiving layer configuration is a mordant.

According to a seventeenth embodiment of the information carrier precursor, according to the present invention, the at least one substance capable of and available for binding at least one species diffusing through the receiving layer configuration is capable of binding image dyes transported thereto by diffusion.

According to an eighteenth embodiment of the information carrier precursor, according to the present invention, the at least one substance capable of and available for binding at least one species diffusing through the receiving layer configuration is capable of binding acid image dyes transported thereto by diffusion.

According to a nineteenth embodiment of the information carrier precursor, according to the present invention, the at least one substance capable of and available for binding at least one species diffusing through the receiving layer configuration is capable of binding at least one functional species selected from the group consisting of diffusible visible dyes, diffusible IR-dyes, diffusible organic luminescent compounds and diffusible organo-metallic luminescent compounds.

The selection of the mordanting agent for mordanting or otherwise binding the diffusing dye(s) in dye diffusion transfer photography is determined by the nature of the dye(s) to be mordanted. It is for instance known to mordant acid dyes with basic polymeric mordants such as polymers of amino-guanidine derivatives of vinyl methyl ketone as described in U.S. Pat. No. 2,882,156, basic polymeric mordants and derivatives like poly-4-vinylpyridine, the metho-p-toluene sulphonate of 2-vinylpyridine and similar compounds as described in U.S. Pat. No. 2,484,430 and the compounds described in the DE-A 2009498 and DE-A 2200063. Other mordants are long-chain quaternary ammonium or phosphonium compounds of ternary sulphonium compounds, e.g. those described in U.S. Pat. No. 3,271,147 and U.S. Pat. No. 3,271,148, and acetyl-trimethyl-ammonium bromide. Certain metal salts and their hydroxides that form sparingly soluble compounds with the acid dyes may be used too. The dye mordants are dispersed or molecularly divided in one of the usual hydrophilic binders in the image-receiving layer, e.g. in gelatin, polyvinylpyrrolidone or partly or completely hydrolysed cellulose esters.

In U.S. Pat. No. 4,186,014 cationic polymeric mordants are described that are particularly suited for fixing anionic dyes, e.g. sulphonic acid salt dyes that are image-wise released by a redox-reaction described in U.S. Pat. No. 4,232,107.

Alternatively non-polymeric mordants can be used such as ammonium salts and phosphonium salts. To prevent bleeding, non-polymeric mordants can be stabilized with a hydrophilic organic colloid containing a finely-divided dispersion of a salt of an organic acidic composition containing free acid moieties as described in U.S. Pat. No. 3,271,147 and U.S. Pat. No. 3,271,148. For example, gelatin that has been acylated with a dicarboxylic acid can be used as stabilizer for the mordant. A combination of a non-polymeric phosphonium mordanting agent and a copolymer latex comprising free weak acid groups as a stabilizer for the mordant can be used, as disclosed in U.S. Pat. No. 4,820,608. The non-polymeric phosphonium mordant could, for example, comprise at least one long chain hydrocarbon group.

Functional Species Precursors

Functional species precursors, according to the present invention, are species diffusing through the receiving layer configuration, which interact with a catalyzing or reacting substance provided in at least one of the constituent receiving layers and the at least one optionally applied layer and rigid sheet or support in diffusion contact with the receiving layer configuration to produce a functional species.

An example of a precursor of a functional species is a metal complex, which develops metal or metal sulphide centres with the metal therefrom; and oxidized developing agents, such as oxidized aromatic primary amino-developing agents, which can react with couplers to produce a visible dye, an infrared dye or a luminescing species.

For example a metal complex can be produced pattern-wise, if the silver halide in a donor layer is developed in the presence of a silver complexing agent or fixer to a silver complex, which diffuses as a solution to metal or metal sulphide centres whereupon the dissolved silver complex is converted to a silver image by physical development on these pre-existing metal or metal sulphide centres.

Substance Capable of and Available for Catalyzing at Least One Species Diffusing Through the Receiving Layer Configuration Substances capable of and available for catalyzing at least one species diffusing through the receiving layer configuration interact with a functional species precursor to produce a functional species e.g. electroless deposition catalysts and metal or metal sulphide centres which react with metal from a diffusing metal complex.

Development nuclei of the type well known in diffusion transfer reversal (DTR) image receiving materials are preferred electroless deposition catalysts e.g. noble metal particles, such as silver particles, and colloidal heavy metal sulphide particles, such as colloidal palladium sulphide, nickel sulphide and mixed silver-nickel sulphide. These nuclei may be present with or without a binding agent.

The electroless deposition catalyst may be non-metallic, e.g. a palladium complex catalytic precursor, such as $[(CH_3-(CH_2)_{16}-CN)_2PdCl_2]$, a self-assembled monolayer terminated with amino or hydroxyl groups, a palladium-activated self-assembled monolayer, a surface-bound colloidal Pd(II) catalyst, activated carbon, polyacetylene or a heavy metal sulphide, such as palladium, silver, nickel, cobalt, copper, lead and mercury sulphides, or a mixed sulphide, e.g. silver-nickel sulphide, or metallic e.g. silver, platinum, rhodium, iridium, gold, ruthenium, palladium and copper particles.

EP-A 0 769 723 discloses a method for preparing physical development nuclei for use in silver salt diffusion transfer processing, the physical development nuclei comprising a heavy metal sulphide, the method comprising the steps of: precipitating the heavy metal sulphide by bringing a water soluble heavy metal compound in reactive association with a water soluble sulphide in an aqueous liquid and the precipitation being carried out in the presence of a hydrophilic polymer so as to disperse the heavy metal sulphide, the hydrophilic polymer comprising a heterocyclic group, characterized in that the heterocyclic group is present in a recurring unit of the hydrophilic polymer, the recurring unit being comprised in the polymer in an amount between 0.1 mol % and 5 mol %.

According to a twentieth embodiment of the information carrier precursor, according to the present invention, the at least one substance capable of and available for reacting with at least one species diffusing through the porous parts of the receiving layer configuration is a metal or metal sulphide centre, which is developed with metal from a metal complex.

Substance Capable of and Available for Reacting with at Least One Species Diffusing Through the Receiving Layer Configuration According to a twenty-first embodiment of the information carrier precursor, according to the present invention, the at least one substance capable of and available for reacting with at least one species diffusing through the receiving layer configuration is a component capable with a functional species precursor of producing a functional species e.g. a cationic substance acting as a mordant and couplers which produce a visible dye, an infrared dye or a luminescing species upon reaction with an oxidized developing agent e.g. an oxidized aromatic primary amino-developing agent.

According to a twenty-second embodiment of the information carrier precursor, according to the present invention, the at least one substance capable of and available for reacting with at least one species diffusing through the receiving layer configuration is a component capable with a functional species precursor of producing a functional species, wherein the component capable of producing a functional species is a coupler which produces a species absorbing in the visible spectrum, a species absorbing in the infrared spectrum or a luminescing species upon reaction with an oxidized developing agent.

Cationic substances increase the capacity of the receiving layer for fixing and binding the dye of the ink droplets. A particularly suitable compound is a poly(diallyldimethylammonium chloride) or, in short, a poly(DADMAC). These compounds are commercially available from several companies, e.g. Aldrich, Nalco, CIBA, Nitto Boseki Co., Clariant, BASF and EKA Chemicals.

Other useful cationic compounds include DADMAC copolymers such as copolymers with acrylamide, e.g. NALCO 1470 trade mark of ONDEO Nalco or PAS-J-81, trademark of Nitto Boseki Co., such as copolymers of DADMAC with acrylates, such as Nalco 8190, trademark of ONDEO Nalco; copolymers of DADMAC with $SO_2$, such as PAS-A-1 or PAS-92, trademarks of Nitto Boseki Co., copolymer of DADMAC with maleic acid, e.g. PAS-410, trademark of Nitto Boseki Co., copolymer of DADMAC with diallyl(3-chloro-2-hydroxypropyl)amine hydrochloride, e.g. PAS-880, trademark of Nitto Boseki Co., dimethylamine-epichlorohydrine copolymers, e.g. Nalco 7135, trademark of ONDEO Nalco or POLYFIX 700, trade name of Showa High Polymer Co.; other POLYFIX grades which could be used are POLYFIX 601, POLYFIX 301, POLYFIX 301A, POLYFIX 250WS, and POLYFIX 3000; NEOFIX E-117, trade name of Nicca Chemical Co., a polyoxyalkylene polyamine dicyanodiamide, and REDIFLOC 4150, trade name of EKA Chemicals, a polyamine; MADAME (methacrylatedimethylaminoethyl=dimethylaminoethyl methacrylate) or MADQUAT (methacryloxyethyl-trimethylammonium chloride) modified polymers, e.g. ROHAGIT KL280, ROHAGIT 210, ROHAGIT SL144, PLEX 4739L, PLEX 3073 from Röhm, DIAFLOC KP155 and other DIAFLOC products from Diafloc Co., and BMB 1305 and other BMB products from EKA chemicals; cationic epichlorohydrin adducts such as POLYCUP 171 and POLYCUP 172, trade names from Hercules Co.; from Cytec industries CYPRO products, e.g. CYPRO 514/515/516, SUPERFLOC 507/521/567; cationic acrylic polymers, such as ALCOSTAT 567, trademark of CIBA, cationic cellulose derivatives such as CELQUAT L-2OO, H-1OO, SC-240C, SC-230M, trade names of Starch & Chemical Co., and QUATRISOFT LM200, UCARE polymers JR125, JR400, LR400, JR30M, LR30M and UCARE polymer LK; fixing agents from Chukyo Europe: PALSET JK-512, PALSET JK512L, PALSET JK-182, PALSET JK-220, WSC-173, WSC-173L, PALSET JK-320, PALSET JK-320L and PALSET JK-350; polyethyleneimine and copolymers, e.g. LUPASOL, trade name of BASF AG; triethanolamine-titanium-chelate, e.g. TYZOR, trade name of Du Pont Co.; copolymers of vinylpyrrolidone such as VIVIPRINT 111, trade name of ISP, a methacrylamido propyl dimethylamine copolymer; with dimethylaminoethylmethacrylate such as COPOLYMER 845 and COPOLYMER 937, trade names of ISP; with vinylimidazole, e.g. LUVIQUAT CARE, LUVITEC 73W, LUVITEC VPI55 K18P, LUVITEC VP155 K72W, LUVIQUAT FC905, LUVIQUAT FC550, LUVIQUAT HM522, and SOKALAN HP56, all trade names of BASF AG; polyamidoamines, e.g. RETAMINOL and NADAVIN, trade marks of Bayer AG; phosphonium compounds such as disclosed in EP 609930 and other cationic polymers such as NEOFIX RD-5, trademark of Nicca Chemical Co.

The receiving layer may further contain well-known conventional ingredients, such as surfactants serving as coating aids, hardening agents, plasticizers, whitening agents and matting agents. Surfactants may be any of the cationic, anionic, amphoteric, and non-ionic ones as described in JP-A 62-280068 (1987). Examples of the surfactants are N-alkylamino acid salts, alkylether carboxylic acid salts, acylated peptides, alkylsulphonic acid salts, alkylbenzene and alkylnaphthalene sulphonic acid salts, sulphosuccinic acid salts, α-olefin sulphonic acid salts, N-acylsulphonic acid salts, sulphonated oils, alkylsulphonic acid salts, alkylether sulphonic acid salts, alkylallylethersulphonic acid salts, alkylamidesulphonic acid salts, alkylphosphoric acid salts, alkyletherphosphoric acid salts, alkylallyletherphosphoric acid salts, alkyl and alkylallylpoly-oxyethylene ethers, alkylallylformaldehyde condensed acid salts, alkylallylether-sulphonic acid salts, alkylamidesulphonic acid salts, alkylphosphoric acid salts, alkyletherphosphoric acid salts, alkylallyletherphosphoric acid salts, alkyl and alkylallylpoly-oxyethylene ethers, alkylallylformaldehyde condensed polyoxyethylene ethers, blocked polymers having polyoxypropylene, polyoxyethylene polyoxypropylalkylethers, polyoxyethyleneether of glycolesters, polyoxyethylene ether of sorbitanesters, polyoxyethylene ether of sorbitolesters, polyethyleneglycol aliphatic acid esters, glycerol esters, sorbitane esters, propyleneglycol esters, sugar esters, fluoro $C_2$-$C_{10}$ alkylcarboxylic acids, disodium N-perfluorooctanesulphonyl glutamate, sodium 3-(fluoro-$C_6$-$C_{11}$-alkyloxy)-1-$C_3$-$C_4$ alkyl sulphonates, sodium 3-(ω-fluoro-$C_6$-$C_8$-alkanoyl-N-ethylamino)-1-propane sulphonates, N-[3-(perfluorooctanesulphonamide)-propyl]-N,N-dimethyl-N-carboxymethylene ammonium betaine, fluoro-$C_{11}$-$C_{20}$ alkyl-carboxylic acids, perfluoro-$C_7$-$C_{13}$-alkyl-carboxylic acids, perfluorooctane sulphonic acid diethanolamide, Li, K and Na perfluoro-$C_4$-$C_{12}$-alkyl sulphonates, N-propyl-N-(2-hydroxy-ethyl)perfluorooctane sulphon-amide, perfluoro-$C_6$-$C_{10}$-alkylsulphon-amide-propyl-sulphonyl-glycinates, bis-(N-perfluorooctylsulphonyl-N-ethanolaminoethyl)-phosphonate, mono-perfluoro $C_6$-$C_{16}$ alkyl-ethyl phosphonates, and perfluoroalkylbetaine.

According to a twenty-third embodiment of the information carrier precursor, according to the present invention, the at least one substance capable of and available for reacting with at least one species diffusing through the porous parts of the receiving layer configuration is a coupler which produces a species absorbing in the visible spectrum, a species absorbing in the infrared spectrum or a luminescing species upon reaction with an oxidized developing agent.

U.S. Pat. No. 4,180,405 discloses a mixture of heat-sensitive color precursors comprising (a) a cyclic polyketo compound reactive with amines and amides at elevated temperatures to form a color; and (b) a chromogenic compound selected from the group consisting of lactone type leuco dyes and spiropyran type leuco dyes, the chromogenic compound being reactive with phenols at elevated temperatures to form a color. Furthermore, EP-A 0 268 704 discloses a dispersed 1-hydroxy-2-N-(5-ballasted-thiazol-2-yl)-naphthamide coupler capable of forming an infrared-absorbing quinone imine dye by reaction with an oxidized aromatic primary amino developing agent. Specific 1-hydroxy-2-N-(5-ballasted-thiazol-2-yl)-naphthamide coupler according to the following general formula are disclosed:

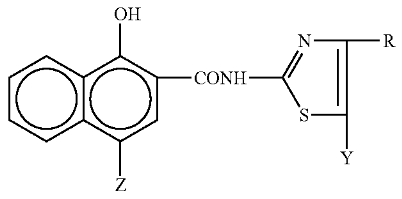

wherein:

R represents a phenyl group or a substituted phenyl group e.g. phenyl carrying at least one substituent selected from the group consisting of a halogen atom, cyano, cyclohexyl, alkylsulphonamido, an aryloxy group, an arylthio group, an alkyl group, an alkoxy group, an alkylthio group, an alkylcarbonyloxy group, the hydrogen atoms of the alkyl group, alkoxy group, alkylthio group, or alkylcarbonyloxy group being unsubstituted or at least one of them having been substituted by a halogen atom, Y represents an alkyl group having at least 8 carbon atoms e.g. tetradecyl, which renders the coupler fast to diffusion in hydrophilic colloid media, Z is hydrogen or a substituent, e.g. a chlorine or bromine atom, that splits off during the coupling reaction, thus conferring 2-equivalent character to the coupler.

Receiving Layer Configuration

The receiving layer configuration comprises a single layer or multiple layers. Only one of the constituent receiving layers of the receiving layer configuration need comprise at least one pigment, at least one binder and consists at least in part of areas which are both opaque and porous and which are transparentizable upon penetration by a lacquer. Multiple layers comprising the receiving layer configuration can be coated or printed simultaneously or sequentially and may have the same or different compositions e.g. to vary the porosity of the individual layers or to locate the at least one substance capable of and available for binding, catalyzing or reacting with at least one species diffusing through the receiving layer configuration can thereby be localized in one or more receiving layers in the receiving layer configuration, the substances in these layers being the same or different.

The receiving layer configuration may be coated onto the support by any conventional coating technique, such as dip coating, knife coating, extrusion coating, spin coating, slide hopper coating and curtain coating, and any conventional printing technique, such as screen printing, offset printing, ink-jet printing, gravure printing and intaglio printing.

The composition of individual layers in the receiving layer configuration can be modified after deposition by coating or printing by, for example, pattern-wise or non-pattern-wise deposition of a substance in a form which can mix with, e.g. upon partial dissolution of the uppermost part of the layer, or diffuse into layer. The at least one substance capable of and available for binding, catalyzing or reacting with at least one species diffusing through the receiving layer configuration can thereby be localized in one or more receiving layers in the receiving layer configuration during the application process.

One or more of the constituent receiving layers may contain, optionally pattern-wise, at least one substance capable of and available for interacting in situ with at least one species diffusing through the receiving layer configuration to produce a functional species.

The constituent receiving layers and the optional supplementary layers used in the information carrier precursor, according to the present invention, may further contain well-known conventional ingredients, such as surfactants serving as coating aids, hardening agents, plasticizers, whitening agents and matting agents.

Suitable surfactants are any of the cationic, anionic, amphoteric, and non-ionic ones as described in JP-A 62-280068 (1987). Examples of the surfactants are N-alkylamino acid salts, alkylether carboxylic acid salts, acylated peptides, alkylsulphonic acid salts, alkylbenzene and alkylnaphthalene sulphonic acid salts, sulphosuccinic acid salts, α-olefin sulphonic acid salts, N-acylsulphonic acid salts, sulphonated oils, alkylsulphonic acid salts, alkylether sulphonic acid salts, alkylallylethersulphonic acid salts, alkylamidesulphonic acid salts, alkylphosphoric acid salts, alkyletherphosphoric acid salts, alkylallyletherphosphoric acid salts, alkyl and alkylallylpolyoxy-ethylene ethers, alkylallylformaldehyde condensed acid salts, alkylallylethersulphonic acid salts, alkylamidesulphonic acid salts, alkylphosphoric acid salts, alkyletherphosphoric acid salts, alkylallyletherphosphoric acid salts, alkyl and alkylallylpolyoxy-ethylene ethers, alkylallylformaldehyde condensed polyoxyethylene ethers, blocked polymers having polyoxypropylene, polyoxyethylene polyoxypropylalkylethers, polyoxyethyleneether of glycolesters, polyoxyethyleneether of sorbitanesters, polyoxyethyleneether of sorbitolesters, polyethyleneglycol aliphatic acid esters, glycerol esters, sorbitane esters, propyleneglycol esters, sugaresters, fluoro $C_2$-$C_{10}$ alkylcarboxylic acids, disodium N-perfluoro-octanesulphonyl glutamate, sodium 3-(fluoro-$C_6$-$C_{11}$-alkyloxy)-1-$C_3$-$C_4$ alkyl sulphonates, sodium 3-(ω-fluoro-$C_6$-$C_8$-alkanoyl-N-ethyl-amino)-1-propane sulphonates, N-[3-(perfluorooctane-sulphonamide)-propyl]-N,N-dimethyl-N-carboxymethylene ammonium betaine, fluoro-$C_{11}$-$C_{20}$ alkylcarboxylic acids, perfluoro-$C_7$-$C_{13}$-alkyl-carboxylic acids, perfluorooctane sulphonic acid diethanolamide, Li, K and Na perfluoro-$C_4$-$C_{12}$-alkyl sulphonates, N-propyl-N-(2-hydroxyethyl)perfluorooctane sulphonamide, perfluoro-$C_6$-$C_{11}$-alkylsulphonamide-propyl-sulphonylglycinates, bis-(N-perfluorooctylsulphonyl-N-ethanolaminoethyl)phosphonate, mono-perfluoro $C_6$-$C_{16}$ alkyl-ethyl phosphonates, and perfluoroalkylbetaine.

Useful cationic surfactants include N-alkyl dimethyl ammonium chloride, palmityl trimethyl ammonium chloride, dodecyldimethylamine, tetradecyldimethylamine, ethoxylated alkyl guanidine-amine complex, oleamine hydroxypropyl bistrimonium chloride, oleyl imidazoline, stearyl imidazoline, cocamine acetate, palmitamine, dihydroxyethylcocamine, cocotrimonium chloride, alkyl polyglycolether ammonium sulphate, ethoxylated oleamine, lauryl pyridinium chloride, N-oleyl-1,3-diaminopropane, stearamidopropyl dimethylamine lactate, coconut fatty amide, oleyl hydroxyethyl imidazoline, isostearyl ethylimidonium ethosulphate, lauramidopropyl PEG-diamonium-chloride phosphate, palmityl trimethylammonium chloride, and cetyltrimethylammonium bromide.

Especially useful surfactants are the fluorocarbon surfactants having a structure of: $F(CF_2)_{4\text{-}9}CH_2CH_2SCH_2CH_2N^+R_3X^-$ wherein R is a hydrogen or an alkyl group as described in e.g. U.S. Pat. No. 4,781,985; and having a structure of: $CF_3(CF_2)_mCH_2CH_2O(CH_2CH_2O)_nR$ wherein m=2 to 10; n=1 to 18; R is hydrogen or an alkyl group of 1 to 10 carbon atoms as described in U.S. Pat. No. 5,084,340. These surfactants are commercially available from DuPont and 3M. The concentration of the surfactant component in the receiving layer is typically in the range of 0.1 to 2%, preferably in the range of 0.4 to 1.5% and is most preferably 0.75% by weight based on the total dry weight of the layer.

Furthermore, the constituent receiving layers may be lightly crosslinked to provide such desired features as waterfastness and non-blocking characteristics. However, the degree of cross-linking should be such that neither the diffusion of the functional species or functional species precursor nor the penetration of the lacquer should be substantially affected. Crosslinking is also useful in providing abrasion resistance and resistance to the formation of fingerprints on the element as a result of handling. There are a vast number of known crosslinking agents—also known as hardening agents—that will function to crosslink film forming binders. Hardening agents can be used individually or in combination and in free or in blocked form. A great many hardeners, useful for the present invention, are known, including formaldehyde and free dialdehydes, such as succinaldehyde and glutaraldehyde, blocked dialdehydes, active esters, sulphonate esters, active halogen compounds, isocyanate or blocked isocyanates, polyfunctional isocyanates, melamine derivatives, s-triazines and diazines, epoxides, active olefins having two or more active bonds, carbodiimides, zirconium complexes, e.g. BACOTE 20, ZIRMEL 1000 or zirconium acetate, trademarks of MEL Chemicals, titanium complexes, such as TYZOR grades from DuPont, isoxazolium salts substituted in the 3-position, esters of 2-alkoxy-N-carboxy-dihydroquinoline, N-carbamoylpyridinium salts, hardeners of mixed function, such as halogen-substituted aldehyde acids (e.g. mucochloric and mucobromic acids), onium substituted acroleins and vinyl sulphones and polymeric hardeners, such as dialdehyde starches and copoly-(acrolein-methacrylic acid), and oxazoline functional polymers, e.g. EPOCROS WS-500, and EPOCROS K-1000 series, and maleic anhydride copolymers, e.g. GANTREZ AN119.

The constituent receiving layers and the optional supplementary layers used in the information carrier precursor, according to the present invention, may also comprise a plasticizer such as ethylene glycol, diethylene glycol, propylene glycol, polyethylene glycol, glycerol monomethylether, glycerol monochlorohydrin, ethylene carbonate, propylene carbonate, tetrachlorophthalic anhydride, tetrabromophthalicanhydride, urea phosphate, triphenylphosphate, glycerolmonostearate, propylene glycol monostearate, tetramethylene sulphone, n-methyl-2-pyrrolidone, n-vinyl-2-pyrrolidone.

The constituent receiving layers and the optional supplementary layers used in the information carrier precursor, according to the present invention, may also comprise ingredients to improve the lightfastness of the printed image, such as antioxidants, UV-absorbers, peroxide scavengers, singlet oxygen quenchers such as hindered amine light stabilizers, (HALS compounds). Stilbene compounds are a preferred type of UV-absorber.

Receiving Layer Pigment

The receiving layer pigment may be chosen from the inorganic pigments well-known in the art such as silica, talc, clay, hydrotalcite, kaolin, diatomaceous earth, calcium carbonate, magnesium carbonate, basic magnesium carbonate, aluminosilicate, aluminum trihydroxide, aluminum oxide (alumina), titanium oxide, zinc oxide, barium sulphate, calcium sulphate, zinc sulphide, satin white, boehmite (alumina hydrate), zirconium oxide or mixed oxides. In a preferred embodiment the main pigment is chosen from silica, aluminosilicate, alumina, calcium carbonate, alumina hydrate, and aluminium trihydroxide.

According to a twenty-fourth embodiment of the information carrier precursor, according to the present invention, the pigment is an inorganic pigment.

According to a twenty-fifth embodiment of the information carrier precursor, according to the present invention, the pigment is silica.

Refractive indices of these pigments are given in the table below:

| inorganic opacifying pigment | refractive index for sodium line at 589.3 nm |
|---|---|
| silica - silica gel | 1.55 |
| SIPERNAT ® 570 | 1.45 to 1.47 |
| kaolinite | 1.53-1.57 |
| bentonite | 1.557 |
| china clay | 1.56 |
| porous alumina pigment e.g. MARTINOX GL-1 | 1.6 |

The use of aluminium oxide (alumina) in receiving layers is disclosed in several patents, e.g. in U.S. Pat. No. 5,041,328, U.S. Pat. No. 5,182,175, U.S. Pat. No. 5,266,383, EP 218956, EP 835762 and EP 972650.

Commercially available types of aluminium oxide (alumina) include α—$Al_2O_3$ types, such as NORTON E700, available from Saint-Gobain Ceramics & Plastics, Inc, γ—$Al_2O_3$ types, such as ALUMINUM OXID C from Degussa, Other Aluminium oxide grades, such as BAIKALOX CR15 and CR30 from Baikowski Chemie; DURALOX grades and MEDIALOX grades from Baikowski Chemie, BAIKALOX CR80, CR140, CR125, B105CR from Baikowski Chemie; CAB-O-SPERSE PG003 trademark from Cabot, CATALOX GRADES and CATAPAL GRADES from Sasol, such as PLURALOX HP14/150; colloidal $Al_2O_3$ types, such as ALUMINASOL 100; ALUMINASOL 200, ALUMINASOL 220, ALUMINASOL 300, and ALUMINASOL 520 trademarks from Nissan Chemical Industries or NALCO 8676 trademark from ONDEO Nalco.

A useful type of alumina hydrate is γ—AlO(OH), also called boehmite, such as, in powder form, DISPERAL, DISPERAL HP14 and DISPERAL 40 from SASOL, MARTOXIN VPP2000-2 and GL-3 from Martinswerk GmbH.; Liquid boehmite alumina systems, e.g. DISPAL 23N4-20, DISPAL 14N-25, DISPERAL AL25 from SASOL. Patents on alumina hydrate include EP 500021, EP 634286, U.S. Pat. No. 5,624,428, EP 742108, U.S. Pat. No. 6,238,047, EP 622244, EP 810101, etc.

Useful aluminum trihydroxides include Bayerite, or α—$Al(OH)_3$, such as PLURAL BT, available from SASOL, and Gibbsite, or γ—$Al(OH)_3$, such as MARTINAL grades from Martinswerk GmbH, MARTIFIN grades, such as MARTIFIN OL104, MARTIFIN OL 107 and MARTIFIN OL111 from Martinswerk GmbH, MICRAL grades, such as MICRAL 1440, MICRAL 1500; MICRAL 632; MICRAL 855; MICRAL 916; MICRAL 932; MICRAL 932CM; MICRAL 9400 from JM Huber company; HIGILITE grades, e.g. HIGILITE H42 or HIGILITE H43M from Showa Denka K.K., HYDRAL GRADES such as HYDRAL COAT 2, HYDRAL COAT 5 and HYDRAL COAT 7, HYDRAL 710 and HYDRAL PGA, from Alcoa Industrial Chemicals.

A useful type of zirconium oxide is NALCO OOSS008 trademark of ONDEO Nalco, acetate stabilized ZrO2, ZR20/20, ZR50/20, ZR100/20 and ZRYS4 trademarks from Nyacol Nano Technologies.

Useful mixed oxides are SIRAL grades from SASOL, colloidal metaloxides from Nalco such as Nalco 1056, Nalco TX10496, Nalco TX11678.

Silica as pigment in receiving elements is disclosed in numerous old and recent patents, e.g. U.S. Pat. No. 4,892,591, U.S. Pat. No. 4,902,568, EP 373573, EP 423829, EP 487350, EP 493100, EP 514633, etc. Different types of silica may be used, such as crystalline silica, amorphous silica, precipitated silica, gel silica, fumed silica, spherical and non-spherical silica, calcium carbonate compounded silica such as disclosed in U.S. Pat. No. 5,281,467, and silica with internal porosity such as disclosed in WO 00/02734. The use of calcium carbonate in receiving layers is described in e.g. DE 2925769 and U.S. Pat. No. 5,185,213. The use of aluminosilicate is disclosed in e.g. DE 2925769. Mixtures of different pigments may be used.

In an alternative embodiment the main pigment can be chosen from organic particles such as polystyrene, polymethyl methacrylate, silicones, melamine-formaldehyde condensation polymers, urea-formaldehyde condensation polymers, polyesters and polyamides. Mixtures of inorganic and organic pigments can be used. However, most preferably the pigment is an inorganic pigment.

The pigment must be present in a sufficient coverage in order to render the receiving layer sufficiently opaque and porous. The lower limit of the ratio by weight of the binder to the total pigment in the receiving layer is preferably about 1:50, most preferably 1:20, while the upper limit thereof is about 2:1, most preferably 1:1. If the amount of the pigment exceeds the upper limit, the strength of the receiving layer itself is lowered, and the resulting image hence tends to deteriorate in rub-off resistance and the like. On the other hand, if the binder to pigment ratio is too great, the ink-absorbing capacity of the resulting receiving layer is reduced, and so the image formed may possibly be deteriorated.

The transparentization process is dependent upon the refraction indices of the pigment on the one hand, and of the lacquer which penetrates the receiving layer (see description below) on the other hand should match each other as closely as possible. The closer the match of the refraction indices the better the transparency which will be obtained after impregnation of the receiver layer with the lacquer.

The most preferred pigment is a silica type, more particularly an amorphous silica having a average particle size ranging from 1 μm to 15 μm, most preferably from 2 to 10 μm. A most useful commercial compound is the amorphous precipitated silica type SIPERNAT 570, trade name from Degussa Co. It is preferably present in the receiving layer in an amount ranging from 5 g/m$^2$ to 30 g/m$^2$. It has following properties:

specific surface area ($N_2$ absorption): 750 m$^2$/g
mean particle size (Multisizer, 100 μm capillarity): 6.7 μm
DBP [DiButyl Phthalate] adsorption: 175-320 g/100 g
refractive index: 1.45 to 1.47.

Since the refractive index of a typical UV-curable lacquer composition is about 1.47 to 1.49 it is clear that there is good match with the refractive index of this particular silica type, and good transparency will be obtained.

Other usable precipitated silica types include SIPERNAT 310, 350 and 500, AEROSIL grades (trade mark of Degussa-Hüls AG), and SYLOID types (trade mark from Grace Co.).

A receiving layer containing a porous alumina pigment such as MARTINOX GL-1 does not become completely transparent upon impregnation with acrylate/methacrylate-based lacquers with a refractive index of 1.47 to 1.49 because its refractive index is 1.6. However, lacquers with higher refractive indexes are possible e.g. including N-vinyl carbazole as comonomer.

The adhesion of receiving layers impregnated with a lacquer according to the method for producing an information carrier, according to the present invention, to the rigid sheet or support undergoes an improvement upon subsequent curing e.g. UV-hardening.

Receiving Layer Binder

The receiving layer binder(s) can be water-soluble, solvent soluble or a latex and can be chosen from a list of compounds well-known in the art including hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulphate; polyvinyl alcohol; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinylmethyl ether/maleic acid copolymer; poly(2-acrylamido-2-methyl propane sulphonic acid); poly(diethylene triamine-co-adipic acid); polyvinyl pyridine; polyvinyl imidazole; polyethylene imine epichlorohydrin modified; polyethylene imine ethoxylated; polyethylene oxide; polyurethane; melamine resins; gelatin; carrageenan; dextran; gum arabic; casein; pectin; albumin; starch; collagen derivatives; collodion and agar-agar.

A preferred binder for the practice of the present invention is a polyvinylalcohol (PVA), a vinylalcohol copolymer or modified polyvinyl alcohol. Most preferably, the polyvinyl alcohol is a silanol modified polyvinyl alcohol. Most useful commercially available silanol modified polyvinyl alcohols can be found in the POVAL R polymer series, trade name of Kuraray Co., Japan. This R polymer series includes the grades R-1130, R-2105, R-2130, R-3109, which differ mainly in the viscosity of their respective aqueous solutions. The silanol groups are reactive to inorganic substances such as silica or alumina. R-polymers can be easily crosslinked by changing the pH of their aqueous solutions or by mixing with organic substances and can form water resistant films.

According to a twenty-sixth embodiment of the information carrier precursor, according to the present invention, the at least one opaque, porous layer further comprises at least one latex, preferably with the at least one opaque, porous layer providing the outermost surface of the receiving layer configuration. Upon varying the pigment/latex ratio between 1.2 and 6.5 (2, 2.2, 2.45, 2.70, 2.75, 3.5, 3.78, 4.25, 5 and 6.25) with SYLOID® W-300 as pigment it was found that the amount of ink bleeding decreased with increasing pigment/latex ratio. At too high ratios of pigment/latex the receiving layer becomes too powdery. With SYLOID® W-300 the best image sharpness was observed at a weight ratio of total pigment to total latex of 2.0 to 3.2. Furthermore, the presence of very high latex concentrations prohibitively reduces the rub-resistance of the printed image.

According to a twenty-seventh embodiment of the information carrier precursor, according to the present invention, the at least one opaque, porous layer comprises at least one latex and the weight ratio of total pigment to total latex is in the range 1.2:1 to 6.5:1.

If the outermost layer of the receiving layer configuration is an opaque, porous layer containing latex, as the latex concentration increases bleeding of ink-jet images printed on the outermost surface of the receiving layer configuration increases with the result that the raster of the ink-jet image is lost in favour of continuous tone imaging. Alternatively as the latex concentration in the outermost opaque, porous layer decreases ink-jet images on the outermost receiving layer become sharper and sharper. The best image quality was found with a total pigment to total latex of 2.0 to 3.2:1 in the case of SYLOID® W-300 as pigment. An increased latex content in the outermost layer of the receiving layer configuration also improves the offset-printability thereof due to the improved adhesion of offset-ink due to the improved adhesion of offset-ink.

Rigid Sheet or Support

According to a twenty-eighth embodiment of the information carrier precursor, according to the present invention, the rigid sheet or support comprises at least one layer and/or a multilayered laminate or co-extrudate. Such multilayer laminates include paper/polymer laminates. Examples of suitable co-extrudates are PET/PETG and PET/polycarbonate.

The support can be a sheet or web support. According to a twenty-ninth embodiment of the information carrier precursor, according to the present invention, the support is a web support.

The support for use in the present invention can be transparent, translucent or opaque, and can be chosen from paper type and polymeric type supports well-known from photographic technology. Paper types include plain paper, cast coated paper, polyethylene coated paper and polypropylene coated paper. Polymeric supports include cellulose acetate propionate or cellulose acetate butyrate, polyesters such as polyethylene terephthalate and polyethylene naphthalate, polyamides, polycarbonates, polyimides, polyolefins, poly (vinylacetals), polyethers and polysulphonamides. Other examples of useful high-quality polymeric supports for the present invention include opaque white polyesters and extrusion blends of polyethylene terephthalate and polypropylene. Polyester film supports and especially polyethylene terephthalate are preferred because of their excellent properties of dimensional stability. When such a polyester is used as the support material, a subbing layer may be employed to improve the bonding of the receiving layer configuration to the support. Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

According to a thirtieth embodiment of the information carrier precursor, according to the present invention, the rigid sheet or support is polyvinyl chloride, polycarbonate or polyester e.g. polyethylene terephthalate, with coloured or whitened polyvinyl chloride, polycarbonate or polyester being preferred.

According to a thirty-first embodiment of the information carrier precursor, according to the present invention, the rigid sheet or support is opacified polyvinyl chloride, polycarbonate or polyester.

Method for Producing an Information Carrier Precursor

Aspects of the present invention are also realized by a method for producing the above-mentioned information carrier precursor, the method comprising the steps of: optionally applying at least one layer to a rigid sheet or support thereby providing an outermost surface; and applying as a continuous or discontinuous layer or print in at least one application step a receiving layer configuration to a rigid sheet or support or the outermost surface of the optionally applied at least one layer, at least one substance capable of and available for interacting in situ with at least one species diffusing through the receiving layer configuration to produce a functional species being provided in at least one of the constituent receiving layers and the at least one optionally applied layer and rigid sheet or support in diffusion contact with the receiving layer configuration.

Aspects of the present invention are also realized by a method for producing an information carrier precursor according to claim 2, the method comprising the step of: optionally applying at least one layer to a rigid sheet or support thereby providing an outermost surface; and applying as a continuous or discontinuous layer or print in at least one application step a receiving layer configuration to a rigid sheet or support or the outermost surface of the optionally applied at least one layer, at least one mordant and/or a component capable of catalyzing the formation of a functional species and/or a species capable with a functional species precursor of producing a functional species being provided in at least one of the constituent receiving layers and the at least one optionally applied layer and rigid sheet or support in diffusion contact with the receiving layer configuration.

According to a first embodiment of the method for producing an information carrier precursor, according to the present invention, the method further comprises the step of pattern-wise transparentization by the pattern-wise penetration into the at least one opaque, porous layer of a transparentizing lacquer and the optional subsequent curing of the penetrated transparentizing lacquer.

According to a second embodiment of the method for producing an information carrier precursor, according to the present invention, the method further comprises the step of pattern-wise transparentization by the pattern-wise penetration into the at least one opaque, porous layer of a transparentizing lacquer and the optional subsequent curing of the penetrated transparentizing lacquer, the penetrating transparentizing lacquer further containing a functional ingredient such as a fluorescent, phosphorescent compound or fibre.

According to a third embodiment of the method for producing an information carrier precursor, according to the present invention, the method further comprises the step of pattern-wise penetration into the at least one opaque, porous layer of a non-transparentizing lacquer and the optional subsequent curing of the penetrated non-transparentizing lacquer.

According to a fourth embodiment of the method for producing an information carrier precursor, according to the present invention, at least part of the outermost surface of the receiving layer configuration is provided with a mechanical means of preventing diffusion into the receiving layer configuration.

According to a fifth embodiment of the method for producing an information carrier precursor, according to the present invention, the method further comprising the step of pattern-wise applying a diffusion inhibitor.

According to a sixth embodiment of the method for producing an information carrier precursor, according to the present invention, the method further comprises the steps of: transparentizing the at least one opaque, porous layer with a vaporizable liquid; producing the at least one substance capable of interacting with at least one species diffusing through the receiving layer configuration by the absorption of UV, visible or IR radiation by a precursor species; and evaporating the vaporizable liquid from the receiving layer configuration thereby restoring the initial opacity of the receiving layer configuration, with laser radiation being preferred.

According to a seventh embodiment of the method for producing an information carrier precursor, according to the present invention, the method further comprises the step of producing said at least one substance capable of and available for interacting with at least one species diffusing through the receiving layer configuration to produce said functional species by the absorption of UV, visible or IR radiation by a precursor species with the receiving layer configuration being temporarily transparentized with a liquid, it being preferred that the UV, visible or IR radiation is laser radiation.

If porous silica e.g. silica gel is used as a pigment in the receiving layer configuration, the following vaporizable liquids are suitable for obtaining temporary transparentization:

| | Boiling point [° C.] | Refractive index at 20° C. with sodium line at 589.3 nm |
|---|---|---|
| 2-butanol | 99.5 | 1.397 |
| n-butyl acetate | 126.1 | 1.394 |
| chloroform | 61.2 | 1.4458 |
| cyclohexane | 80.7 | 1.426 |
| cyclopentane | 49.3 | 1.406 |
| dichloromethane | 39.8 | 1.4241 |
| 1,4-dioxane | 101 | 1.4224 |
| ethylene glycol | 198.9 | 1.4318 |
| methylethylketone | 79.6 | 1.379 |
| N-methyl-2-pyrrolidone | 202.0 | 1.488 |
| heptane | 98.4 | 1.3878 |
| Isobutyl alcohol | 107.9 | 1.396 |
| octane | 125.7 | 1.3974 |
| tetrachloroethylene | 121.2 | 1.506 |
| tetrahydrofuran | 66 | 1.4072 |
| toluene | 110.6 | 1.497 |
| trichloroethylene | 87 | 1.4767 |
| 2,2,4-trimethylpentane | 99.2 | 1.391 |

According to an eighth embodiment of the method for producing an information carrier precursor, according to the present invention, the process further comprises the printing of the rigid sheet or support with a security print e.g. guilloches, graphics, regular and irregular arrays of symbols, geometric shapes, and non-geometric shapes or a random configuration as obtained by rainbow or iris printing.

According to a ninth embodiment of the method for producing an information carrier precursor, according to the present invention, the method further comprises the provision of a non-printed security feature on the rigid sheet or support.

According to a tenth embodiment of the method for producing an information carrier precursor, according to the present invention, the method further comprises the step of applying a digitally stored set of information to the rigid sheet or support using a conventional printing process e.g. using ink-jet printing, electrophotographic printing, electrographic printing or thermal transfer printing or diffusion transfer reversal processes.

According to an eleventh embodiment of the method for producing an information carrier precursor, according to the present invention, the method further comprises applying at least one continuous or non-continuous layer to the rigid sheet or support using a conventional coating or printing technique.

According to a twelfth embodiment of the method for producing an information carrier precursor, according to the present invention, the method further comprises applying a digitally stored set of information to the rigid sheet or support using a conventional printing process e.g. using ink-jet printing, electrophotographic printing, electrographic printing or thermal transfer printing to at least one continuous or non-continuous layer applied to the rigid sheet or support.

According to a thirteenth embodiment of the method for producing an information carrier precursor, according to the present invention, the method further comprises applying a metal fibre or strip in a hardenable composition to at least one of the constituent receiving layers of the receiving layer configuration.

According to a fourteenth embodiment of the method for producing an information carrier precursor, according to the present invention, the method further comprises applying a metal fibre or strip in a hardenable composition to the rigid sheet or support.

Method for Producing an Information Carrier

Aspects of the present invention are also realized by a method for producing an information carrier, the method comprising the following steps: (i) providing the above-mentioned information carrier precursor; (ii) applying a composition comprising at least one functional species or functional species precursor pattern-wise to the outermost surface of the receiving layer configuration to produce a pattern in the information carrier precursor; (iii) applying the transparentizing lacquer to at least part of the areas of the outermost surface of the receiving layer configuration corresponding to the porous parts of the at least one opaque, porous layer thereby transparentizing at least in part the parts of the at least one opaque, porous layer which are opaque and porous to which the transparentizing lacquer has been applied; (iv) optionally curing the transparentizing lacquer; (v) if there are parts of the layer which are opaque and porous after step (iv) applying non-transparentizing lacquer to the opaque and porous parts of the outermost layer of the receiving layer configuration thereby filling the pores of those parts of the receiving layer configuration to which the transparentizing lacquer had not been applied; and (vi) optionally curing the non-transparentizing lacquer. This method in general results in a functional species which is visually detectable i.e. human readable, can be detected by the use of light via fluorescence or phosphorescence i.e. human readable with the assistance of an appropriate light source or are machine readable e.g. electrically or magnetically.

The species, singular or plural, diffusing through the receiving layer configuration can itself/themselves be (a) species which is/are visually detectable i.e. human readable, can be detected by the use of light via fluorescence or phosphorescence i.e. human readable with the assistance of an appropriate light source or are machine readable e.g. electrically or magnetically i.e. is a functional species.

Alternatively the species diffusing through the receiving layer configuration are themselves catalyzed by the at least one substance or are catalyzed together with other species by the at least one substance to produce a species which is visually detectable i.e. human readable, can be detected by the use of light via fluorescence or phosphorescence i.e. human readable with the assistance of an appropriate light source or are machine readable e.g. electrically or magnetically i.e. is a functional species.

The final alternative is that the species diffusing through the receiving layer configuration reacts itself or together with other species to produce a species which is visually detectable i.e. human readable, can be detected by the use of light via fluorescence or phosphorescence i.e. human readable with the assistance of an appropriate light source or are machine readable e.g. electrically or magnetically i.e. is a functional species.

The cohesive force of the receiving layer configuration and the adhesive force between the receiver and the support are strongly improved by curing rendering in this way the information carrier tamper proof since it has become strongly resistant to mechanical and chemical influences.

Apparatuses for UV-curing are known to those skilled in the art and are commercially available. For example, the curing proceeds with medium pressure mercury vapour lamps with or without electrodes, or pulsed xenon lamps. These ultraviolet sources usually are equipped with a cooling installation, an installation to remove the produced ozone and optionally a nitrogen inflow to exclude air from the surface of the product to be cured during radiation processing. An intensity of 40 to 240 W/cm in the 200-400 nm region is usually employed. An example of a commercially available UV-curing unit is the DRSE-120 conveyor from Fusion UV Systems Ltd., UK with a VPS/1600 UV lamp, an ultraviolet medium-pressure electrodeless mercury vapour lamp. The DRSE-120 conveyor can operate at different transport speeds and different UV power settings over a width of 20 cm and a length in the transport direction of 0.8 cm. Moreover, it can also be used with metal halide-doped Hg vapour or XeCl excimer lamps, each with its specific UV emission spectrum. This permits a higher degree of freedom in formulating the curing composition: a more efficient curing is possible using the lamp with the most appropriate spectral characteristics. A pulsed xenon flash lamp is commercially available from IST Strahlentechnik GmbH, Nürtingen, Germany.

According to a first embodiment of the method for producing an information carrier, according to the present invention, the method further comprises the step of applying a pattern to the outermost surface of the receiving layer configuration using a conventional printing process, with non-impact printing or impact printing being preferred and with ink-jet printing being particularly preferred.

According to a second embodiment of the method for producing an information carrier, according to the present invention, the method further comprises the step of applying a pattern to the opaque and porous parts of the outermost layer of the receiving layer configuration using a conventional printing process, with non-impact printing or impact printing being preferred and with ink-jet printing being particularly preferred.

According to a third embodiment of the method for producing an information carrier, according to the present invention, the method further comprises the step of applying a digitally stored set of information to the outermost surface of the receiving layer configuration using a conventional printing process e.g. using ink-jet printing, electrophotographic printing, electrographic printing or thermal transfer printing. In a most preferred embodiment this digitally stored information is personalized information different for each individual item present on the information carrier. For instance, this personalized information may be a unique individual card number assigned to the future bearer of the card, or the expiry date of the validity of the card, or personal data of the future bearer, e.g. a birth day, and/or a photo. Again, when the information carrier is meant to be cut in multiple ID cards, the ink jet printing step is repeated over multiple areas of the support in register with the security print pattern when present, thereby providing each item with different personalized information.

According to a fourth embodiment of the method for producing an information carrier, according to the present invention, the penetrating transparentizing lacquer further comprises a functional ingredient such as a fluorescent or phosphorescent compound, a fluorescent or phosphorescent fibre and a compound or compound mixture with a characteristic smell, such as a perfume or scent.

According to a fifth embodiment of the method for producing an information carrier, according to the present invention, the method further comprises the step of applying a pattern to the receiving layer configuration using a non-impact printing technique.

According to a sixth embodiment of the method for producing an information carrier, according to the present invention, the method further comprises the step of applying a pattern to the receiving layer configuration using an impact printing technique.

According to a seventh embodiment of the method for producing an information carrier, according to the present invention, a hologram is written on or applied to the surface of the rigid sheet or support and/or to the surface of any layer comprised in the information carrier e.g. the outermost surface of the information carrier.

According to an eighth embodiment of the method for producing an information carrier, according to the present invention, an embossable layer is applied to the surface of the rigid sheet or support and/or to the surface of any layer comprised in the information carrier e.g. the outermost surface of the information carrier and the embossable layer is then embossed e.g. as a hologram.

According to a ninth embodiment of the method for producing an information carrier, according to the present invention, a black image is printed on the outermost surface of the receiving layer configuration and the black image develops a relief pattern upon UV-irradiation.

According to a tenth embodiment of the method for producing an information carrier, according to the present invention, a metal fibre or strip is applied in a hardenable composition to the outermost surface of the receiving layer configuration.

According to a eleventh embodiment of the method for producing an information carrier, according to the present invention, a pattern or metal nuclei or heavy metal sulphide is applied provided beneath an embossed pattern contiguous with the surface of the receiving layer configuration closer to the rigid sheet or support and a silver layer is realized under the embossed pattern by a process, optionally photographic, of producing a non-continuous silver layer on the nucleation layer using silver salt diffusion transfer.

When the information carrier is meant to be cut later on into multiple identity cards the security print is repeatedly applied over multiple areas of the web or sheet by a step and repeat process thus giving rise to multiple identical items. These multiple identical items are distributed over the support according to a fixed pattern, e.g. a rectangular grid. Furthermore, the application and curing of the varnish is repeated over multiple areas of the information carrier (in register) with the multiple different items already present consisting of optional security print and personalized information.

An opaque background can be realised by selecting a lacquer capable of penetrating into the receiving layer configuration, but with a refractive index that differs too much from the refractive index of the pigment, so that it is not capable to render the receiving layer configuration transparent.

Another way to keep the background opaque is by curing the lacquer composition before it can substantially penetrate into the receiving layer configuration. The penetration behaviour of varnish and lacquer are reversed compared to the first embodiment. This behaviour again is controlled by the viscosity and/or the affinity and/or the penetration time.

Ink-Jet Printing

If ink jet printing is used, in the method for producing an information carrier, according to the present invention, it may be performed by any known technique known in the art. In a first type of process a continuous droplet stream is created by applying a pressure wave pattern. This process is known as continuous ink jet printing. In a first embodiment the droplet stream is divided into droplets that are electrostatically charged, deflected and recovered, and into droplets that remain uncharged, continue their way undeflected, and form the image. Alternatively, the charged deflected stream forms the image and the uncharged undeflected jet is recollected. In this variant of continuous ink jet printing several jets are deflected to a different degree and thus record the image (multideflection system).

According to a second ink-jet process the ink droplets can be created “on demand” (“DOD” or “drop on demand” method) whereby the printing device ejects the droplets only when they are used in imaging on a receiver thereby avoiding the complexity of drop charging, deflection hardware, and ink recollection. In drop-on-demand the ink droplet can be formed by means of a pressure wave created by a mechanical motion of a piezoelectric transducer (so-called “piezo method”), or by means of discrete thermal pushes (so-called “bubble jet” method, or “thermal jet” method).

Ink compositions for ink jet typically include following ingredients: dyes or pigments, water and/or organic solvents, humectants such as glycols, detergents, thickeners, polymeric binders, preservatives, etc. It will be readily understood that the optimal composition of such an ink is dependent on the ink jetting method used and on the nature of the substrate to be printed. The ink compositions can be roughly divided into:

water based: the drying mechanism involves absorption, penetration and evaporation;

oil based: drying involves absorption and penetration;

solvent based: drying mechanism involves primarily evaporation;

hot melt or phase change: the ink vehicle is liquid at the ejection temperature but solid at room temperature; drying is replaced by solidification;

UV-curable: drying is replaced by photopolymerization.

The colorants present in the ink jet ink may be dyes which are molecularly dissolved in the ink fluid, e.g. acid dyes which are bound by a cationic mordant in the ink receiver, or they may be pigments which are finely dispersed in the ink fluid.

Transparentizing Lacquer Compositions

The substantial penetration of the at least one opaque, porous layer by the lacquer can be realized by controlling the penetration time and/or the affinity and/or the viscosity of the composition.

The viscosity of the transparentizing lacquer composition is adjusted to ensure rapid penetration and hence rapid transparentization.

According to a twelfth embodiment of the method for producing an information carrier, according to the present invention, the lacquer is a curable lacquer e.g. thermally curable, electron beam curable or photopolymerizable.

According to a thirteenth embodiment of the method for producing an information carrier, according to the present invention, the lacquer is a radiation curable lacquer.

According to a fourteenth embodiment of the method for producing an information carrier, according to the present invention, the lacquer is a photopolymerizable lacquer.

Transparentization process depends upon the refraction indices of the pigment and of the lacquer which penetrates the receiving layer configuration matching each other as closely as possible. The closer the match of the refraction indices the better the transparency that will be obtained after impregnation of the receiver layer with the lacquer. Therefore, the choice of ingredients for the lacquer has to be such as to fulfil this requirement. Additional constraints on the composition of the lacquer are determined by whether the lacquer is required to be curable and if curable which curing process has been selected.

According to a fifteenth embodiment of the method for producing an information carrier, according to the present invention, the refractive index of the pigment and the refractive index of the transparentizing lacquer differ by no more than 0.1.

According to a sixteenth embodiment of the method for producing an information carrier, according to the present invention, the refractive index of the pigment and the refractive index of the transparentizing lacquer differ by no more than 0.04.

According to a seventeenth embodiment of the method for producing an information carrier, according to the present invention, the refractive index of the pigment and the refractive index of the transparentizing lacquer differ by no more than 0.02.

Refractive indices of representative polymers are given below:

| | Refractive index for sodium line at 589.3 nm [ASTM D642] |
|---|---|
| polystyrene | 1.57-1.60 |
| poly-α-methyl-styrene | 1.610 |
| poly-4-methyl-styrene | — |
| poly-α-vinyl-naphthalene | 1.6818 |
| polyacrylonitrile | 1.514, 1.5187 |
| polymethacrylonitrile | 1.520 |
| polymethyl methacrylate | 1.49, 1.4893 |
| polyacrylamide | — |
| copolymer of acrylonitrile and styrene | 1.56-1.57, 1.57 |
| copolymer of 28.5 wt % acrylonitrile and 71.5 wt % styrene | 1.56-1.57, 1.57 |

An essential ingredient of a curable lacquer is at least one monomer. In the case of the curable lacquer being a photopolymerizable lacquer the lacquer will further contain at least one photoinitiator.

The refractive index of curable lacquers based on acrylates and methacrylates are there typically 1.47 to 1.49 and hence the use of such compositions as lacquers, according to the present invention, will provide a good match with the refractive index of SIPERNAT 570 with a refractive index of 1.45 to 1.47, and hence good transparency is obtained.

According to a thirty-second embodiment of the information carrier precursor, according to the present invention, the refractive index of the pigment and the refractive index of the transparentizing lacquer differ by less than 0.1.

According to a thirty-third embodiment of the information carrier precursor, according to the present invention, the refractive index of the pigment and the refractive index of the transparentizing lacquer differ by less than 0.04.

According to a thirty-fourth embodiment of the information carrier precursor, according to the present invention, the refractive index of the pigment and the refractive index of the transparentizing lacquer differ by less than 0.02.

Suitable monomers for use in curable lacquers include the monomers disclosed in DE-OS 4005231, DE-OS 3516256, DE-OS 3516257, DE-OS 3632657 and U.S. Pat. No. 4,629,676, unsaturated esters of polyols, particularly such esters of the α-methylene carboxylic acids, e.g. ethylene diacrylate, glycerol tri(meth)acrylate, diethylene glycol di(meth)acrylate, 1,3-propanediol di(meth)acrylate, 1,2,4-butanetriol tri (meth)acrylate, 1,4-cyclohexanediol di(meth)acrylate, 1,4-benzenediol di(meth)acrylate, pentaerythritol tetra(meth) acrylate, pentaerythritol triacrylate, dipentaerythritol pentaacrylate, trimethylolpropane triacrylate, 1,5-pentadiol di(meth)acrylate, the bis-acrylates and bis-methacrylates of polyethylene glycols of molecular weight 200-500; unsaturated amides, particularly those of the α-methylene carboxylic acids, and especially those of α,ω-diamines and oxygen-interrupted ω-diamines, such as bis-acrylamide, methylene bis-methacrylamide, 1,6-hexamethylene bis-acrylamide, diethylene triamine tris-methacrylamide, bis(γ-methacrylamidopropoxy)ethane, β-methacrylamidoethyl methacrylate, N-(β-hydroxyethyl)-β-(methacrylamido)ethyl acrylate, and N,N-bis(β-methacryloyl-oxyethyl)acrylamide; vinyl esters, e.g. divinyl succinate, divinyl adipate, divinyl phthalate, divinyl butane-1,4-disulphonate; and unsaturated aldehydes, e.g. sorbaldehyde (hexadienal).

Curable lacquers may also comprise polymers and/or oligomers comprising two or more different polymerizable functions, e.g. acrylated epoxies, polyester acrylates, urethane acrylates, etc.

It is also possible to use monofunctional (meth)acrylic acid esters as monomer provided they are not to volatile and do not spread an unwanted odour. Suitable compounds include n-octylacrylate, decylacrylate, decylmethacrylate, stearylacrylate, stearylmethacrylate, cyclohexylacrylate, cyclohexylmethacrylate, phenylethylacrylate, phenylethylmethacrylate. The most preferred compounds comprise one or more (meth) acrylate functional groups.

Preferred monomers for use in UV-curable photopolymerizable compositions have at least one (meth)acrylate functional group, such as those disclosed in EP-A 0 502 562.

A non-exhaustive list of monomers including commercially available compounds (chemical and commercial names) suitable for use in the transparentizing curable compositions used in the method for producing an information carrier, according to the present invention, are given below:

Monomers/Oligomers:

(Chemical Name; Type, Vendor)

pentaerythritol triacrylate; SR-444 (Sartomer)

trimethylolpropane triacrylate; SR-351 (Sartomer)

dipropyleneglycol diacrylate; SR-508 (Sartomer)

amine modified polyether acrylate oligomer; CN-501 (Sartomer)

isobornyl acrylate; SR-506 (Sartomer)

diethyleneglycol divinylether; RAPI-CURE DVE-2 (ISP)

triethyleneglycol divinylether; RAPI-CURE DVE-3 (ISP)

urethane acrylate blended with 2(2-ethoxyethoxy)ethylacrylate (SR-256); CN-966H90 (Sartomer)

polybutadiene dimethyl acrylate; CN-301 (Sartomer)

low viscosity oligomer; CN-135 (Sartomer)

low viscosity oligomer; CN-137 (Sartomer)

A wide variety of photopolymerizable and photocrosslinkable compounds can be used in the present invention. Suitable photoinitiators include all compounds or compound combinations known for this purpose. Examples are benzoin ethers, benzil ketals, polycyclic quinones, benzophenone derivatives, triarylimidazolyl dimers, photosensitive trihalomethyl compounds, for example trichloromethyl-s-triazines. Preferred photoinitiators are the 2,3-bisarylquinoxalines, as disclosed in U.S. Pat. No. 3,765,898, and 2-aryl-4,6-bistrichloromethyl-s-triazines. The amount of photoinitiator or photoinitiator combination is generally between 1 and 25% by weight of the photopolymerizable composition and preferably between 5 and 15% by weight.

Non-exhaustive lists of photoinitiators and thermal initiators including commercially available compounds (chemical and commercial names) suitable for use in the transparentizing curable compositions used in the method for producing an information carrier, according to the present invention, are given below:

Photoinitiators:

IRGACURE 907 (from Ciba-Geigy Co.)
NOVOPOL PI3000 (from Rahn Co.)
GENOCURE DEAP (from Rahn Co.)
IRGACURE 184 (from Ciba-Geigy Co.)
EZACURE KK (from Fratelli Lamberti Co.)
IRGACURE 500 (from Ciba-Geigy Co.)
IRGACURE 819 (from Ciba-Geigy Co.)

Thermal Initiators:

AIBN—dicumyl peroxide—benzoyl peroxide—t-butyl peroxide—VAZO compounds (from DuPont Co.), e.g. VAZO 52—LUPEROX (from Atofina Co.), e.g. 233, 10, 11, 231, 101,-hydroperoxides, and peresters.

Photopolymerizable lacquers may also contain a minor amount of a heat polymerization inhibitor which prevents premature polymerization before the UV curing step. Examples of such inhibitors include p-methoxyphenol, hydroquinone, aryl- or alkyl substituted hydroquinone, t-butylcatechol, pyrogallol, copper(I) chloride, phenothiazine, chloranil, naphtylamine, α-naphtol, 2,6-di-t-butyl-p-cresol, etc. A preferred polymerization inhibitor is 2-methyl hydroquinone. The heat polymerization inhibitors are preferable used in an amount of 0.001 to 5 parts by weight per 100 parts of monomer.

Curable lacquers may optionally contain a minor amount of organic solvent, e.g. ethyl acetate. Suitable solvents for use in the transparentizing curable compositions used in the method for producing an information carrier, according to the present invention, include the following commercially available compounds (chemical and commercial names).

According to an eighteenth embodiment of the method for producing an information carrier, according to the present invention, the lacquer further contains at least one fluorescent compound, whitening agent or colorant e.g. a dye or a pigment.

Non-Transparentizing Lacquer Composition

Non-transparentizing lacquer compositions giving an at least partially opaque background are also capable of penetrating into the at least one opaque, porous layer, but will have a refractive index that differs too much from the refractive index of the pigment, so that it is not capable to render the receiving layer configuration i.e. significantly more than 0.12 units above or below the refractive index of the pigment used in the receiving layer configuration e.g. by using vinyl carbazole or α-vinyl-naphthalene as the sole or comonomer (polyvinyl carbazole and poly-α-vinyl-naphthalene have refractive indices of 1.695 and 1.6818 respectively), with more than 0.13 units above or below the refractive index of the pigment used in the receiving layer configuration being preferred.

The refractive index of curable lacquers based on styrenes are typically ca. 1.60 and hence the use of such compositions as lacquers, according to the present invention, will provide a good match with the refractive index of SIPERNAT 570 with a refractive index of 1.45 to 1.47, and hence no transparency is obtained. Lacquers with even higher refractive indices are possible e.g. those including N-vinyl carbazole as comonomer. Alternatively the use of acrylate/methacrylate-based lacquers with a refractive index of 1.47 to 1.49 with receiving layer configurations comprising a porous alumina pigment such as MARTINOX GL-1 with a refractive index of 1.6 also ensures that no transparency is obtained.

Information Carrier

According to a first embodiment of the information carrier, according to the present invention, the information carrier is an identification card selected from the group consisting of an identity card, a security card, a driver's license card, a social security card, a membership card, a time registration card, a bank card, a pay card, a credit card and a passport page.

According to a second embodiment of the information carrier according to the present invention, the information carrier is provided with a printed pattern or image, with an offset-, screen-, flexo-, driographically or ink-jet printed pattern or image being preferred and an ink-jet printed pattern or image being particularly preferred.

Most types of ID cards have now the standardized dimensions of 85.6 mm×54.0 mm×0.76 mm. This final thickness can be reached by thermal lamination of one or more polymeric foils, e.g. PVC foils. The finished ID card can serve as an identity card, a security card, a driver's license card, a social security card, a bank card, a membership card, a time registration card, a pay card and a credit card, etc.

Apart from the features described above the finished ID card may comprise additional security elements or information carriers such as a hologram, a magnetic strip, or a chip ("smart cards").

According to a third embodiment of the information carrier according to the present invention, the information carrier is a flexible sheet e.g. a security document, any page of a passport or a page of a passport with personalized data of the bearer.

According to a fourth embodiment of the information carrier according to the present invention, the information carrier is an admission document e.g. a visa, a ticket for an event and lottery tickets.

The present invention will now be illustrated by the following examples without however being limited thereto. The percentages and ratios given in these examples are by weight unless otherwise indicated.

EXAMPLES

Subbing Layers

The coating solution for subbing layer No. 01 has the following composition and was coated at 130 $m^2$/L:

| | |
|---|---|
| Copolymer of 88% vinylidene chloride, 10% methyl acrylate and 2% itaconic acid | 68.8 g |
| Kieselsol ™ 100F, a colloidal silica from BAYER | 16.7 g |
| Mersolat ™ H, a surfactant from BAYER | 0.36 g |
| Ultravon ™ W, a surfactant from CIBA-GEIGY | 1.68 g |
| Water to make | 1000 g |

The coating solution for subbing layer No. 02 has the following composition and was coated at 30 $m^2$/L:

| | |
|---|---|
| Gelatin | 11.4 g |
| Kieselsol ™ 100F-30, a colloidal silica from BAYER | 10.08 g |
| Ultravon ™ W, a surfactant from CIBA-GEIGY | 0.4 g |
| Arkopal ™, a surfactant from CLARIANT | 0.2 g |
| Hexylene glycol | 0.67 g |
| Trimethylolpropane | 0.33 g |
| Copolymer of 74% maleic acid, 25% styrene and 1% methylmethacrylate | 0.03 g |
| Water to make | 1000 g |

Gelatin Layers:

The coating solution for the gelatin layer No. 01 has the following composition and was coated at 35 $m^2$/L:

| | |
|---|---|
| Gelatin | 40 g |
| Hostapon ™ T, a surfactant from CLARIANT | 1 g |
| Formaldehyde (4%) | 40 g |
| Water to make | 1000 g |

Physical Development Layers:

The coating solution for the physical development No. 01 has the following composition and was coated with a 20 μm Braive coating knife:

| | |
|---|---|
| Palladium sulphide physical development nuclei dispersion | 200 g |
| Zonyl ™ FSO-100, a surfactant from DUPONT | 0.5 g |
| Water to make | 1000 g |

The preparation of the palladium sulphide physical development nuclei is described in the example of EP-A 0 769 723, herein incorporated by reference. From this example, solutions A1, B1 and C1 were used to prepare a nuclei-dispersion with a concentration of 0.0038 mol/L.

Receiving Media:

| Receiving medium nr | |
|---|---|
| 1 | 125 μm PET with an adhesion promoting layer No. 01, subbing layer No. 02 and physical development layer No. 01 |
| 2 | 125 μm PET with an adhesion promoting layer No. 01, subbing layer No. 02, gelatin layer No. 01 and physical development layer No. 01 |
| 3 | PET-SAN with physical development layer No. 01 |
| 4 | A laminate of 63 μm PET with 30 μm PETG with physical development layer No. 01 on the PETG side |

Invention Example 1

A 100 μm thick sheet of transparent polyethylene terephthalate subbed with subbing layer 1 was coated with subbing layer No 1 and then with the porous receiver layer dispersion with the composition given in table 1:

TABLE 1

| Composition of porous receiver layer solution. | |
|---|---|
| Syloid ™ W300, a colloidal silica from GRACE GMBH | 75.6 g |
| Poval PVA R3109, a silanol modified polyvinyl alcohol from KURARAY CO. | 2.3 g |
| Catfloc ™ T2, a cationic polyelectrolyte from CALGON EUROPE | 5.6 g |
| Bronidox ™ K, a biocide from HENKEL (5% solution in ethanol) | 0.3 g |
| Citric acid | 0.3 g |
| Polysol ™ EVA P-550, a 50% aqueous emulsion of an ethylene-vinyl acetate-vinyl versatate copolymer from SHOWA HIGH POLYMER CO. | 100 g |
| Aerosol ™ OT, a surfactant from CYTEC | 1.5 g |
| Tergitol ™ 4, a surfactant from UNION CARBIDE | 1 g |
| Water to make | 1000 g |

using a 100 μm wirebar followed by drying at 50° C. producing an opaque porous layer with a layer thickness of 22 μm and an optical density of 0.19 measured with a MacBeth RB918-SB densitometer with a visible filter and with a black sheet of cardboard with a density of 1.35 placed under the transparent polyethylene terephthalate support. With a white background beneath the transparent polyethylene terephthalate support an optical density of 0.06 was measured with a visible filter indicating a certain transparency, although the "opaque" porous layer provides a white non-transparent film due to the extremely high haze of the layer of 97% as measured with a Haze-Gard Plus apparatus from BYK-GARDNER according to ASTM D1003.

Model experiments were carried out with liquids to determine what refractive index difference was acceptable with the above-described opaque porous layer without a prohibitive decrease in optical density. The results are given in Table 2 together with the optical density obtained upon transparentization with the lacquer with the composition given in Table 3 below:

TABLE 2

| Liquid | Refractive index at 20° C. with sodium line at 589.3 nm | Optical density (visible filter/black background) of "opaque" porous layer upon wetting with the liquid |
|---|---|---|
| deionized water | 1.3325 | 0.70 |
| methylethyketone | 1.379 | 1.13 |
| dichloromethane | 1.4241 | 1.26 |
| toluene | 1.497 | 1.37 |
| lacquer given in Table 3 | | 1.40 |

On the basis of the optical density achieved with the lacquer given in Table 3, extrapolation gives a value for the refractive index of the pigment in the opaque porous layer of ca. 1.52.

Solutions of a wide range of surfactants were also applied to the above-described opaque porous layer and after drying in a drying cupboard the part of the opaque porous layer to which the surfactant solutions had been applied were overcoated with the lacquer given in Table 3 below with a 50 μm wirebar. Without applying a surfactant solution overcoating of the above-described opaque porous layer with this lacquer under the same conditions provided a layer with an optical density of 1.40 and a haze of 6% measured as described above.

TABLE 3

| Composition of UV curable transparent lacquer | |
|---|---|
| Isobornylacrylate | 416.2 g |
| Actilane ™ 411, a monofunctional acrylate diluent from AKZO NOBEL | 247.7 g |
| Ebecryl ™ 1039, an urethanemonoacrylate from UCB CHEMICALS | 178.4 g |
| Ebecryl ™ 11, a polyethylene glycol diacrylate from UCB CHEMICALS | 99.1 g |
| Irgacure ™ 500, a photo-initiator from CIBA-GEIGY | 49.6 g |
| Perenol ™ S Konz (50% in ethyl acetate), a surfactant from HENKEL | 9 g |

The resulting transparentization was assessed visually using the following criteria:

| Assessment | |
|---|---|
| 0 | wetted area completely transparent |
| 1 | wetted area very slightly opaque |
| 2 | wetted area fairly opaque |
| 3 | wetted area moderately opaque |
| 4 | wetted area almost completely opaque |
| 5 | wetted area completely opaque |

The results are given in Table 4:

TABLE 4

| | INHIBITOR nr. | Diffusion Inhibitor structure | Qualitative indication of inhibition |
|---|---|---|---|
| Ambiteric H | 01 | 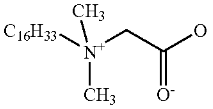 | 1 |
| Cetyltri-methyl-ammonium bromide | 02 | 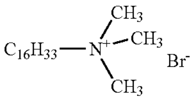 | 2 |
| Dow Corning 190 | 03 | 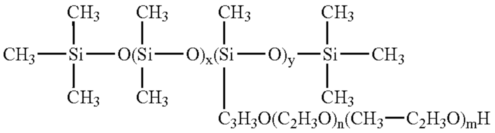 | 1 |
| FT 248 | 04 | 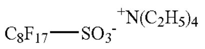 | 1 |
| Hostapon T | 05 | 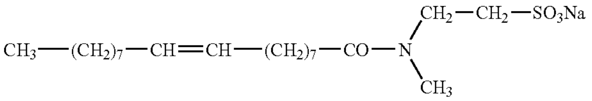 | 3 |
| Marlon A 365 | 06 | 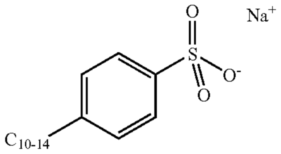 | 2 |
| Perfluoro-octanoic acid | 07 | 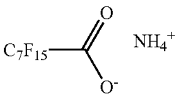 | 2 |
| Cetrimide BP | 08 | 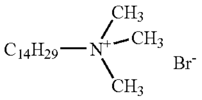 | 1 |

TABLE 4-continued

| INHIBITOR nr. | Diffusion Inhibitor structure | Qualitative indication of inhibition |
|---|---|---|
| 104 | 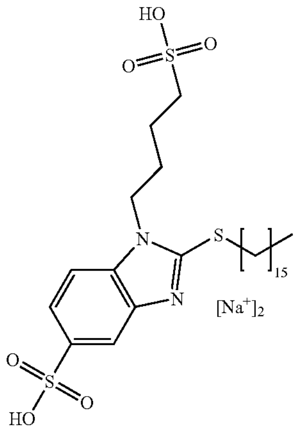 | 5 |

These results may only be regarded as a qualitative indication of diffusion inhibition properties, since the experiments neither took the potential degree of coverage of the particles with the surfactant into account nor the purity of the surfactant. Complete opacity was only observed when INHIBITOR 104, 2-thiohexadecyl,3-sulphobutyl-benzimidazole-6-sulphonic acid sodium salt, was used. At least one member from the classes of cationic, anionic and non-ionic surfactants were found to exhibit diffusion inhibition. The presence of long chain alkyl, alkenyl and fluoro-alkyl groups was found to be beneficial, whereas, with the notable exception of INHIBITOR 03, non-ionic surfactants with poly(alkylene oxide) groups failed to exhibit diffusion inhibition.

The diffusion inhibition properties of INHIBITOR 104 were explored quantitatively by applying water and aqueous or aqueous ethanolic solutions of INHIBITOR 104, 2-thiohexadecyl,3-sulphobutylbenzimidazole-6-sulphonic acid sodium salt at various concentrations and with varying amounts to the surface of the above-described opaque porous layer. After drying for 30 minutes under ambient conditions, the part of the opaque porous layer to which the surfactant solution had been applied was overcoated with the lacquer given in Table 3 in INVENTION EXAMPLE 1 with a 50 μm wirebar.

The optical density observed for the part of the opaque porous layer to which the surfactant had been applied was measured for each surfactant with a black sheet of cardboard under the transparent polyethylene terephthalate support.

The spots observable after penetration and UV-curing of the lacquer varied in size depending upon the liquid applied and for some liquids upon the quantity of liquid applied. In some experiments including those with water a halo-effect was observed with an opaque outer ring and a transparent centre. The spot size for the densitometer measurements was 4 mm, which was not much smaller than some of the spots leading to anomalous optical density values in the case of spots with halo's.

High optical density values represent a high degree of transparentization, since it is the optical density of the black sheet of cardboard combined with that of the polyethylene terephthalate support which is being measured. A low optical density represents a low degree of transparentization, since it is the optical density of the opaque porous receiving layer which is being measured. The results are summarized in Table 5 below with the quantities or quantities/$cm^2$ deposited in parentheses:

TABLE 5

| Quantity | | Optical density with 1 μL | Optical density with 2 μL | Optical density with 5 μL | Optical density with 10 μL |
|---|---|---|---|---|---|
| Water | | 1.36 ($1 \times 10^{-6}$ g/$cm^2$) | 1.38 ($2 \times 10^{-6}$ g/$cm^2$) | 1.40 ($5.3 \times 10^{-6}$ g/$cm^2$) | 0.66 ($5 \times 10^{-6}$ g/$cm^2$) |
| Concentration of aqueous solution of INHIBITOR 104 | 5% | 1.39 ($5 \times 10^{-8}$ g/$cm^2$) | 1.33 ($1 \times 10^{-7}$ g/$cm^2$) | 1.41 ($2.5 \times 10^{-7}$ g/$cm^2$) | 1.40 ($5 \times 10^{-7}$ g/$cm^2$) |
| | 7% | 1.32 ($7 \times 10^{-8}$ g/$cm^2$) | 1.37 ($2.8 \times 10^{-7}$ g/$cm^2$) | 1.40 ($7 \times 10^{-7}$ g/$cm^2$) | 0.74 ($1.4 \times 10^{-6}$ g/$cm^2$) |
| | 10% | 0.97 ($2 \times 10^{-7}$ g/$cm^2$) | 1.33 ($4 \times 10^{-7}$ g/$cm^2$) | 0.35 ($10^{-6}$ g/$cm^2$) | 0.15 ($2 \times 10^{-6}$ g/$cm^2$) |
| Concentration of INHIBITOR 104 in 90/10 water/ethanol | 10% | 1.27 ($10^{-7}$ g/$cm^2$) | 1.14 ($7 \times 10^{-7}$ g/$cm^2$) | 1.02 ($7.8 \times 10^{-7}$ g/$cm^2$) | 0.19 ($2 \times 10^{-6}$ g/$cm^2$) |
| Concentration of INHIBITOR 104 in 80/20 water/ethanol | 10% | 1.30 ($10^{-7}$ g/$cm^2$) | 1.19 ($2 \times 10^{-7}$ g/$cm^2$) | 1.09 ($5 \times 10^{-7}$ g/$cm^2$) | 0.49 ($10^{-6}$ g/$cm^2$) |
| Concentration of INHIBITOR 104 in 70/30 water/ethanol | 10% | 1.32 ($10^{-7}$ g/$cm^2$) | 1.37 ($2 \times 10^{-7}$ g/$cm^2$) | 1.37 ($5 \times 10^{-7}$ g/$cm^2$) | 0.34 ($10^{-6}$ g/$cm^2$) |

TABLE 5-continued

| Quantity | | Optical density with 1 μL | Optical density with 2 μL | Optical density with 5 μL | Optical density with 10 μL |
|---|---|---|---|---|---|
| Concentration of INHIBITOR 104 in 60/40 water/ethanol | 10% | 1.36 ($10^{-7}$ g/cm$^2$) | 1.32 (2 x $10^{-7}$ g/cm$^2$) | 1.35 (5 x $10^{-7}$ g/cm$^2$) | 1.38 ($10^{-7}$ g/cm$^2$) |
| Concentration of INHIBITOR 104 in 50/50 water/ethanol | 10% | 1.39 ($10^{-7}$ g/cm$^2$) | 1.25 (2 x $10^{-7}$ g/cm$^2$) | 0.74 (5 x $10^{-7}$ g/cm$^2$) | 1.38 ($10^{-7}$ g/cm$^2$) |
| Concentration of INHIBITOR 104 in 40/60 water/ethanol | 10% | 1.26 ($10^{-7}$ g/cm$^2$) | 0.83 (4 x $10^{-7}$ g/cm$^2$) | 1.24 (4.4 x $10^{-7}$ g/cm$^2$) | 0.64 (1.05 x $10^{-6}$ g/cm$^2$) |

The results in Table 5 show that 1 μL, 2 μL and 5 μL of water provide no inhibition of the transparentization process, but that 10 μL of water is sufficient to provide for partial inhibition of the transparentization process.

The results in Table 5 clearly show that the presence of ethanol in the carrier medium reduces the inhibiting influence of INHIBITOR 104 for the same quantity of INHIBITOR 104. This is presumably due to preferred adsorption of ethanol over water and INHIBITOR 104. Effective inhibition appears, in the absence of ethanol, to require the deposition of between $10^{-3}$ and 2×$10^{-3}$ g/cm$^2$. The haze of such layers measured as described above was 98%.

The permanence of this inhibitor was investigated by coating the UV curable transparentizing lacquer composition given in Table 2 with a 50 μm wirebar at different times after the application of . . . μL of water or 10 μL of an 10% aqueous solution of INHIBITOR 104 and determining the optical density with a black sheet of cardboard under the transparent polyethylene terephthalate support. The results are given in Table 6 with the quantities or quantities/cm$^2$ deposited in parentheses.

TABLE 6

| | Optical density of layer configuration after period at room temperature between application and coating with transparentizing lacquer according to Table 2 of: | | | | | | | |
|---|---|---|---|---|---|---|---|---|
| | 1 s | 5 s | 10 s | 30 s | 60 s | 120 s | 300 s | 600 s |
| 5 μL Water | 0.22 (1.3 x $10^{-5}$ g/cm$^2$) | 0.21 | 0.21 | 0.23 | 0.23 (7.8 x $10^{-6}$ g/cm$^2$) | 0.22 | 0.24 | 1.37 (3.2 x $10^{-6}$ g/cm$^2$) |
| 5 μL of a 10% aqueous solution of INHIBITOR 104 | 0.18 (1 x $10^{-6}$ g/cm$^2$) | 0.19 | 0.18 | 0.19 | 0.18 (1 x $10^{-6}$ g/cm$^2$) | 0.18 | 0.17 | 0.21 (1 x $10^{-6}$ g/cm$^2$) |

These results show no transparentization was observed with water until more than 5 minutes had elapsed i.e. until the water had evaporated i.e. that water inhibits the transparentization process. With the 10% aqueous solution of INHIBITOR 104, on the other hand, there was no significant effect on the transparentization process with the lacquer even after a 10 minute delay between the application of the 10% aqueous solution of INHIBITOR 104 and the application of the transparentizing lacquer. This clearly shows that the inhibiting effect with INHIBITOR 104 is permanent and that of water temporary.

The possible diffusion inhibiting influence of INHIBITOR 104 upon ink-jet images was then investigated with ink-jet images produced with an Epson Photostylus R800 ink-jet printer with pigment-based aqueous inks. The above-described opaque porous layer was first spotted a 10% aqueous solution of INHIBITOR 104, dried and then yellow, magenta, cyan and black areas were printed on both the INHIBITOR 104-treated area and on a non-INHIBITOR 104-treated area. The optical densities were measured with a black paper sheet under the transparent support of the opaque porous layer with a Macbeth RD918SB reflection densitometer using visual, blue, green and red filters. The results are summarized in Table 7 below:

TABLE 7

| | | Yellow areas | Magenta areas | Cyan areas | Black areas |
|---|---|---|---|---|---|
| Optical density (visual filter) | Area treated with INHIBITOR 104 | 0.26 | 0.89 | 0.58 | 2.02 |
| | Area not treated with INHIBITOR 104 | 0.20 | 0.75 | 0.49 | 1.18 |
| | Density increase due to treatment | 0.06 | 0.14 | 0.09 | 0.84 |

TABLE 7-continued

| | | Yellow areas | Magenta areas | Cyan areas | Black areas |
|---|---|---|---|---|---|
| Optical density (blue filter) | Area treated with INHIBITOR 104 | 1.05 | 0.54 | 0.37 | 2.05 |
| | Area not treated with INHIBITOR 104 | 1.00 | 0.42 | 0.30 | 1.19 |
| | Density increase due to treatment | 0.05 | 0.12 | 0.07 | 0.86 |
| Optical density (green filter) | Area treated with INHIBITOR 104 | 0.24 | 1.24 | 0.42 | 1.95 |

TABLE 7-continued

| | | Yellow areas | Magenta areas | Cyan areas | Black areas |
|---|---|---|---|---|---|
| | Area not treated with INHIBITOR 104 | 0.17 | 0.99 | 0.32 | 1.18 |
| | Density increase due to treatment | 0.07 | 0.25 | 0.10 | 0.77 |
| Optical density (red filter) | Area treated with INHIBITOR 104 | 0.25 | 0.48 | 0.81 | 1.81 |
| | Area not treated with INHIBITOR 104 | 0.20 | 0.41 | 0.75 | 1.16 |
| | Density increase due to treatment | 0.05 | 0.07 | 0.06 | 0.65 |

The results in Table 7 clearly show that treatment with INHIBITOR 104 increased the optical densities by up to 0.86 involved indicating that diffusion into the opaque porous layer has been inhibited by the presence of INHIBITOR 104.

The ink-jet images were then coated with the transparentizing lacquer given in Table 3 above with a 50 μm wirebar. The optical densities were measured with a black paper sheet under the transparent support of the opaque porous layer with a Macbeth RD918SB reflection densitometer using visual, blue, green and red filters. The results are summarized in Table 8 below:

TABLE 8

| | | Yellow areas | Magenta areas | Cyan areas | Black areas |
|---|---|---|---|---|---|
| Optical density (visual filter) | Area treated with INHIBITOR 104 | 0.28 | 0.88 | 0.57 | 1.95 |
| | Area not treated with INHIBITOR 104 | 1.22 | 1.68 | 1.55 | 2.43 |
| | Density loss due to treatment | 0.94 | 0.80 | 0.98 | 0.48 |
| Optical density (blue filter) | Area treated with INHIBITOR 104 | 1.08 | 0.51 | 0.37 | 2.04 |
| | Area not treated with INHIBITOR 104 | 1.85 | 1.41 | 1.42 | 2.51 |
| | Density loss due to treatment | 0.77 | 0.90 | 1.05 | 0.47 |
| Optical density (green filter) | Area treated with INHIBITOR 104 | 0.24 | 1.24 | 0.39 | 1.97 |
| | Area not treated with INHIBITOR 104 | 1.13 | 2.00 | 1.44 | 2.50 |
| | Density loss due to treatment | 0.89 | 0.76 | 1.05 | 0.53 |
| Optical density (red filter) | Area treated with INHIBITOR 104 | 0.26 | 0.46 | 0.81 | 1.90 |
| | Area not treated with INHIBITOR 104 | 1.30 | 1.36 | 1.73 | 2.43 |
| | Density loss due to treatment | 1.04 | 0.90 | 0.92 | 0.53 |

Areas pretreated with INHIBITOR 104, subsequently ink-jetted with a color image, stay perfectly opaque after being provided with an UV-curable cover layer, whereas areas not pretreated with INHIBITOR 104 were completely transparentized.

Invention Examples 2 and 3

A diffractive pattern was created on Receiving Media nr. 2 and 4 by hot embossing at 110° C. with a nickel shim (DIFTONE from AVANTONE OY) on the side of the Receiving media coated with physical development layer No. 1. utilizing an Interlock Cardjet laminator. at a temperature setting of 200° C. and pressure setting of 1000 kg.

The diffraction patterns on Receiving media nr. 2 and 4 were then coated with a porous receiver layer solution with the composition given in Table 1 of INVENTION EXAMPLE 1 using a 100 μm wirebar and the layer dried at 50° C. to provide the information carrier precursors of INVENTION EXAMPLES 2 and 3. Due to the opaque layer, the diffractive pattern was no longer visible.

A silver layer was deposited on physical development layer No. 1 ceiving medium nr 1 via a diffusion transfer reversal (DTR) process by bringing transfer emulsion layer NPC6 (Copyproof Negative Film from AGFA-GEVAERT™) in contact with receiving layer configurations of the information carrier precursors of INVENTION EXAMPLES 2 and 3 at 25° C. for 1 minute with an AGFA-GEVAERT™ CP297 developer solution and subsequently drying at room temperature.

The porous receiver layer was then overcoated with a UV curable transparent lacquer as given in Table 3 of INVENTION EXAMPLE 1. The lacquer was applied with a 50 μm wirebar. About two minutes after the application of the solution curing was performed by means of a DRSE-120 conveyor with VPS/1600 UV lamp (speed 20 m/min, 50% UV power setting). To obtain a complete curing three passes were necessary. Due to the complete penetration of the UV lacquer in the ink receiver layer, the latter became totally transparent so that the underlying diffractive pattern became clearly visible.

Finally, Scotchgard™ Phototool Protector (from 3M) was applied with a 10 μm wirebar and cured by means of a DRSE-120 conveyor with VPS/1600 UV lamp (speed 20 m/min, 100% UV power setting, one pass).

Invention Example 4

Dispersion A was first prepared by mixing the following ingredients:

| | |
|---|---|
| SIPERNAT 570 a porous silica from Degussa = | 18.70 g |
| POVAL R-3109, a silanol modified polyvinyl alcohol from Kuraray = | 2.70 g |
| Cat Floc T2: a medium molecular weight poly(diallyldimethyl- ammonium chloride), a cationic polyelectrolyte from Calgon Europe N.V., as a solution in water containing ca. 33% active polymer and ca. 11% glycerol, = | 1.70 g |
| 5% solution of a biocide = | 0.03 g |
| 10% solution of citric acid = | 0.03 g |
| deionized water = | 55.14 g |

This dispersion was then used to prepare the following receiver layer formulation:

| | |
|---|---|
| Dispersion A = | 57.30 g |
| Polysol EVA P550, an ethylene-vinyl acetate-vinyl versatate copolymer stabilized with a non-ionic surfactant from Showa High Polymer Co = | 5.00 g |
| Cat Floc T2: see above = | 0.20 g |
| a 20% solution in water of a polymer type mordant having the following formula: = | 37.50 g |

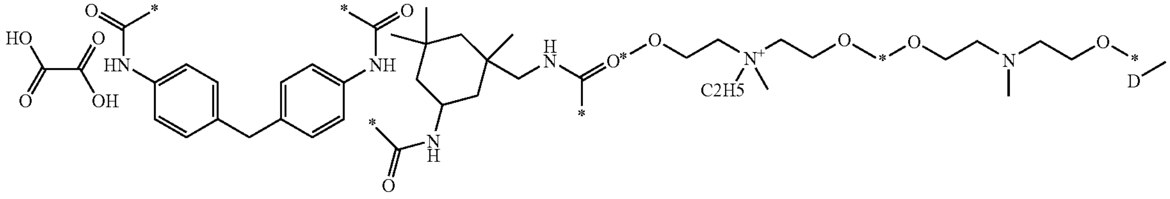

The thus prepared receiver formulation was coated on an opaque PET support (thickness 100 μm) provided with subbing layer no. 1.

After drying, the resulting information carrier precursor was processed in contact with a photographic dye diffusion transfer material [Agisscolor Negative™ material (format: A4) (Agfa-Gevaert N.V.)], which had been previously image-wise exposed, as described in U.S. Pat. No. 4,496,645.

The Agisscolor Negative™ material (format: A4) (Agfa-Gevaert N.V.) was contacted with the information carrier precursor in a Copyproof CP38™ (Agfa-Gevaert N.V.) apparatus filled with G830b™ (Agfa-Gevaert N.V.) activator solution. After a contact time of approx. 1 min. the information carrier precursor was peeled off from the Agisscolor Negative™ material, rinsed in water for 10 sec. and dried.

The optical densities were measured with a Macbeth™ RD918SB densitometer. The results are given in Table 9 together with the filters used in the measurements and the optical densities of a dye diffusion image on regular Agisscolor Positive under the same imaging and processing conditions in brackets.

TABLE 9

| Optical densities of dye diffusion transfer image colours | | | |
|---|---|---|---|
| Filter | Dye diffusion transfer image: solid coloured areas | | |
| selection | Blue | Green | Red |
| Visual filter | 0.98 (1.77) | 0.33 (0.78) | 0.71 (1.03) |
| Green filter | 1.21 (1.96) | 0.24 (0.52) | 1.05 (1.90) |
| Blue filter | 0.40 (0.64) | 1.37 (1.90) | 1.35 (1.92) |
| Red filter | 0.55 (1.98) | 0.47 (1.87) | 0.10 (0.23) |

In addition to the above described dye diffusion transfer (DDT) image, a second image was built up on this DDT-imaged receiver using an Epson Stylus Color 900 inkjet printer. The optical densities of this inkjet image measured with a Macbeth™ RD918SB densitometer with the filters used in these measurements are given in Table 10, for the sake of completeness.

TABLE 10

| Optical densities of inkjet printed image | | | | | | |
|---|---|---|---|---|---|---|
| | Inkjet image: solid coloured areas | | | | | |
| Filter selection | Blue | Green | Red | Turquoise | Pink | Yellow |
| Visual filter | 0.98 | 0.63 | 0.61 | 0.29 | 0.45 | 0.09 |
| Green filter | 0.82 | 0.48 | 1.09 | 0.17 | 0.70 | 0.14 |
| Blue filter | 0.42 | 1.36 | 1.12 | 0.15 | 0.29 | 0.84 |
| Red filter | 1.37 | 0.92 | 0.05 | 0.47 | 0.04 | 0.03 |

The colour balance of the DDT-image in the inkjet receiver comprising mordant polymers is clearly very different from that in the regular Agisscolor Positive receiver.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. An information carrier precursor comprising a rigid sheet or support; a receiving layer configuration comprising at least one layer; and at least one substance, provided pattern-wise, capable of and available for interacting in situ with at least one species diffusing through the receiving layer configuration to produce a functional species, wherein at least one layer of said receiving layer configuration is opaque, porous, has the capability of being rendered substantially transparent by penetration by a lacquer provided at the outermost surface of said receiving layer configuration and comprises at least one pigment and at least one binder, wherein the at least one substance provided pattern-wise is a diffusion inhibitor according to formula (I):

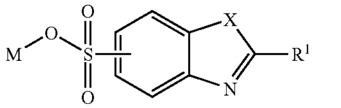

(I)

wherein M is hydrogen, an alkali atom or an ammonium group; $R^1$ is an alkyl, alkenyl-, alkynyl-, thioalkyl-, thioalkenyl- or thioalkynyl-group in which the alkyl-, alkenyl- or alkynyl-group has 6 to 25 carbon atoms; X is —O—, —S— or —$N(R^2)$—; and $R^2$ is hydrogen, a —$(CH_2)_mSO_3M$ group or a

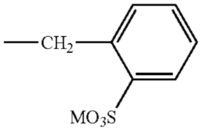

group; and m is an integer between 1 and 5.

2. The information carrier precursor according to claim 1, wherein said rigid sheet or support comprises at least one layer and/or a multilayered laminate.

3. The information carrier precursor according to claim 1, wherein said at least one substance capable of and available for interacting in situ with at least one species diffusing through said receiving layer configuration to produce a functional species is capable of and available for binding and/or is capable of and available for catalyzing and/or is capable of and available for reacting with at least one species diffusing through the receiving layer configuration.

4. The information carrier precursor according to claim 1, wherein said at least one opaque, porous layer further comprises at least one latex.

5. The information carrier precursor according to claim 4, wherein the weight ratio of total pigment to total latex is in the range 1.2 to 6.5.

6. The information carrier precursor according claim 1, wherein said at least one substance is present in at least one layer or pattern adjacent to or contiguous with said receiving layer configuration.

7. The information carrier precursor according to claim 1, further comprising a mordant capable of binding image dyes transported thereto by diffusion.

8. The information carrier precursor according to claim 7, wherein said image dyes are acid image dyes transported thereto by diffusion.

9. The information carrier precursor according to claim 7, wherein said mordant is capable of providing preferential adsorption to at least one functional species selected from the group consisting of diffusible visible dyes, diffusible IR-dyes, diffusible organic luminescent compounds and diffusible organometallic luminescent compounds.

10. The information carrier precursor according to claim 1, wherein the refractive index of said pigment and the refractive index of said lacquer differ by no more than 0.1.

11. The information carrier precursor according to claim 1, wherein the refractive index of said pigment and the refractive index of said lacquer differ by no more than 0.04.

12. The information carrier precursor according to claim 1, wherein said rigid sheet or support has been preprinted with a security print.

13. The information carrier precursor according to claim 1, wherein said rigid sheet or support is polyvinyl chloride, polycarbonate or polyester.

14. The information carrier precursor according to claim 1, wherein said pigment is an inorganic pigment.

15. The information carrier precursor according to claim 14, wherein said inorganic pigment is silica.

16. The information carrier precursor according to claim 1, wherein said at least one substance capable of and available for reacting with at least one species diffusing through said receiving layer configuration is a component capable of producing a functional species by interacting with a precursor of a functional species.

17. A method for producing an information carrier precursor as defined by claim 1 comprising a rigid sheet or support; a receiving layer configuration comprising at least one layer; and at least one substance, provided pattern-wise, capable of and available for interacting in situ with at least one species diffusing through the receiving layer configuration to produce a functional species, wherein at least one layer of said receiving layer configuration is opaque, porous, has the capability of being rendered substantially transparent by penetration by a lacquer provided at the outermost surface of said receiving layer configuration and comprises at least one pigment and at least one binder, said method comprising the steps of: optionally applying at least one layer to a rigid sheet or support thereby providing an outermost surface; and applying as a continuous or discontinuous layer or print in at least one application step a receiving layer configuration to a rigid sheet or support or the outermost surface of said optionally applied at least one layer, at least one substance capable of and available for interacting in situ with at least one species diffusing through the receiving layer configuration to produce a functional species being provided in at least one of the constituent receiving layers and the at least one optionally applied layer and rigid sheet or support in diffusion contact with the receiving layer configuration.

18. The method according to claim 17, wherein said method further comprises the step of pattern-wise transparentization by the pattern-wise penetration into said at least one opaque, porous layer of a transparentizing lacquer and the subsequent optional curing of said penetrated transparentizing lacquer.

19. The method according to claim 17, wherein said method further comprises the step of pattern-wise penetration into said at least one opaque, porous layer of a non-transparentizing lacquer and the subsequent optional curing of said penetrated non-transparentizing lacquer.

20. The method according to claim 17, wherein said method further comprises the step of producing said at least one substance capable of and available for interacting with at least one species diffusing through the receiving layer configuration to produce said functional species by the absorption of UV, visible or IR radiation by a precursor species with said receiving layer configuration being temporarily transparentized with a liquid.

21. The method according to claim 20, wherein said UV, visible or IR radiation is laser radiation.

22. An information carrier obtained according to the method of claim 1 comprising the following steps:

(i) providing an information carrier precursor comprising a rigid sheet or support; a receiving layer configuration comprising at least one layer; and at least one substance, provided pattern-wise, capable of and available for interacting in situ with at least one species diffusing through the receiving layer configuration to produce a functional species, wherein at least one layer of said receiving layer configuration is opaque, porous, has the capability of being rendered substantially transparent by penetration by a lacquer provided at the outermost surface of said receiving layer configuration and comprises at least one pigment and at least one binder;

(ii) applying a composition comprising at least one functional species or functional species precursor pattern-wise to the outermost surface of said receiving layer configuration to produce a pattern in said information carrier precursor;

(iii) applying the transparentizing lacquer to at least part of the areas of the outermost surface of the receiving layer configuration corresponding to the porous parts of the at least one opaque, porous layer thereby transparentizing at least in part the parts of the at least one opaque, porous layer which are opaque and porous to which the transparentizing lacquer has been applied;

(iv) optionally curing said transparentizing lacquer;

(v) if there are parts of the layer which are opaque and porous after step (iv) applying non-transparentizing lacquer to said opaque and porous parts of said outermost layer of said receiving layer configuration thereby filling the pores of those parts of said receiving layer configuration to which said transparentizing lacquer had not been applied; and (vi) optionally curing said non-transparentizing lacquer.

23. A method for producing an information carrier as defined by claim 22, said method comprising the following steps:

(i) providing an information carrier precursor comprising a rigid sheet or support; a receiving layer configuration comprising at least one layer; and at least one substance, provided pattern-wise, capable of and available for interacting in situ with at least one species diffusing through the receiving layer configuration to produce a functional species, wherein at least one layer of said receiving layer configuration is opaque, porous, has the capability of being rendered substantially transparent by penetration by a lacquer provided at the outermost surface of said receiving layer configuration and comprises at least one pigment and at least one binder;

(ii) applying a composition comprising at least one functional species or functional species precursor pattern-wise to the outermost surface of said receiving layer configuration to produce a pattern in said information carrier precursor;

(iii) applying the transparentizing lacquer to at least part of the areas of the outermost surface of the receiving layer configuration corresponding to the porous parts of the at least one opaque, porous layer thereby transparentizing at least in part the parts of the at least one opaque, porous layer which are opaque and porous to which the transparentizing lacquer has been applied;

(iv) optionally curing said transparentizing lacquer;

(v) if there are parts of the layer which are opaque and porous after step (iv) applying non-transparentizing lacquer to said opaque and porous parts of said outermost layer of said receiving layer configuration thereby filling the pores of those parts of said receiving layer configuration to which said transparentizing lacquer had not been applied; and (vi) optionally curing said non-transparentizing lacquer.

24. The method according to claim 23, wherein said method further comprises the step of applying an image or pattern to the outermost layer of said receiving layer configuration using a conventional printing process.

25. The method according to claim 23, wherein said method further comprises the step of applying an image or pattern to said areas of the outermost layer which correspond to the porous parts of said at least one opaque, porous layer using a conventional printing process.

26. The method according to claim 24 or 25, wherein said conventional printing process is ink-jet printing.

27. The information carrier according to claim 22, wherein said information carrier is an identification card selected from the group consisting of an identity card, a security card, a driver's license card, a social security card, a membership card, a time registration card, a bank card, a pay card, a credit card.

28. The information carrier according to claim 22, wherein the support is selected from the group consisting of polyvinyl chloride, polycarbonate and polyester.

29. The information carrier according to claim 22, wherein the information carrier is an admission document.

30. The information carrier precursor according to claim 1, wherein the pattern-wise applied diffusion inhibitor is a 2-alkyl-benzimidazole-sulphonic acid compound or a 2-thio-alkyl-benzimidazole-sulphonic acid compound.

31. The information carrier precursor according to claim 1, wherein, in formula (I), $R^1$ is an alkyl group selected from the group consisting of dodecyl, tridecyl, tetradecyl, pentadecyl, hexadecyl, heptadecyl, and octadecyl.

32. The information carrier precursor according to claim 31, wherein, in formula (I), $R^2$ is $—(CH_2)_mSO_3M$.

* * * * *